United States Patent [19]

Peregrim et al.

[11] Patent Number: 5,168,529

[45] Date of Patent: Dec. 1, 1992

[54] CONFIRMED BOUNDARY PATTERN MATCHING

[75] Inventors: Theodore J. Peregrim, Bedford; Albert H. Long, Framingham; Irving Kanter, Lexington, all of Mass.

[73] Assignee: Rayethon Company, Lexington, Mass.

[21] Appl. No.: 237,921

[22] Filed: Aug. 29, 1988

[51] Int. Cl.⁵ ............................ G06K 9/38; G06K 9/20
[52] U.S. Cl. ................................... 382/48; 382/34; 382/41; 382/50
[58] Field of Search ................ 382/22, 34, 41, 48, 382/49, 50, 27, 56; 364/135

[56] References Cited

U.S. PATENT DOCUMENTS

| | | | |
|---|---|---|---|
| 4,327,354 | 4/1982 | Persoon | 382/22 |
| 4,521,772 | 6/1985 | Lyon | 382/50 |
| 4,521,773 | 6/1985 | Lyon | 382/50 |
| 4,606,066 | 8/1986 | Hata et al. | 382/41 |
| 4,700,400 | 10/1987 | Ross | 382/27 |
| 4,742,552 | 5/1988 | Andrews | 382/41 |
| 4,783,841 | 11/1988 | Crayson | 382/34 |
| 4,797,939 | 1/1989 | Hoki et al. | 382/48 |

*Primary Examiner*—David Cain
*Attorney, Agent, or Firm*—Donald F. Mofford; Richard M. Sharkansky

[57] ABSTRACT

A method of aligning two images of the same scene by matching features in a first image to features in a second image is disclosed. The method comprises identifying edges of objects in the first image using two different processes. The edges identified using both processes are compared and combined into one image representing confirmed edges which are readily identified in other images of the same scene. A template is then formed from the confirmed edges which is matched to a subregion of the second image.

2 Claims, 19 Drawing Sheets

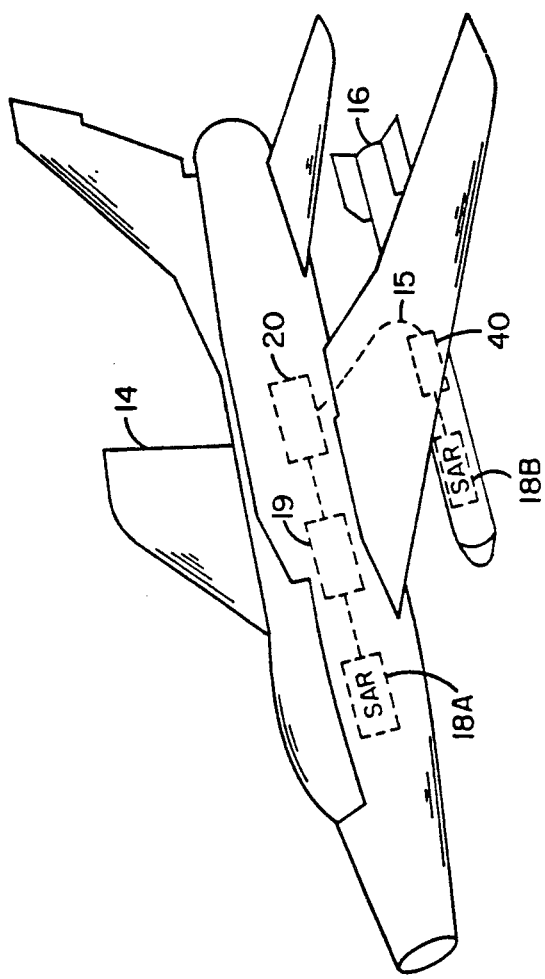
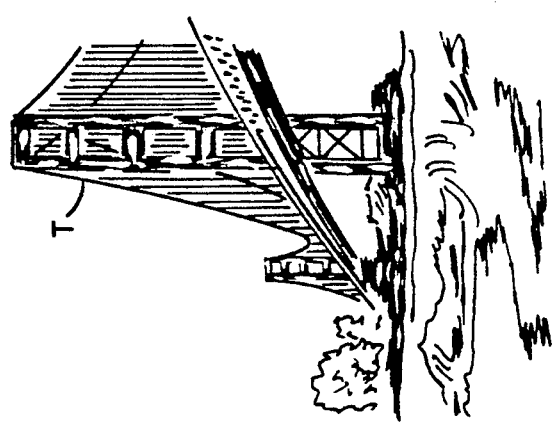
FIG. 1

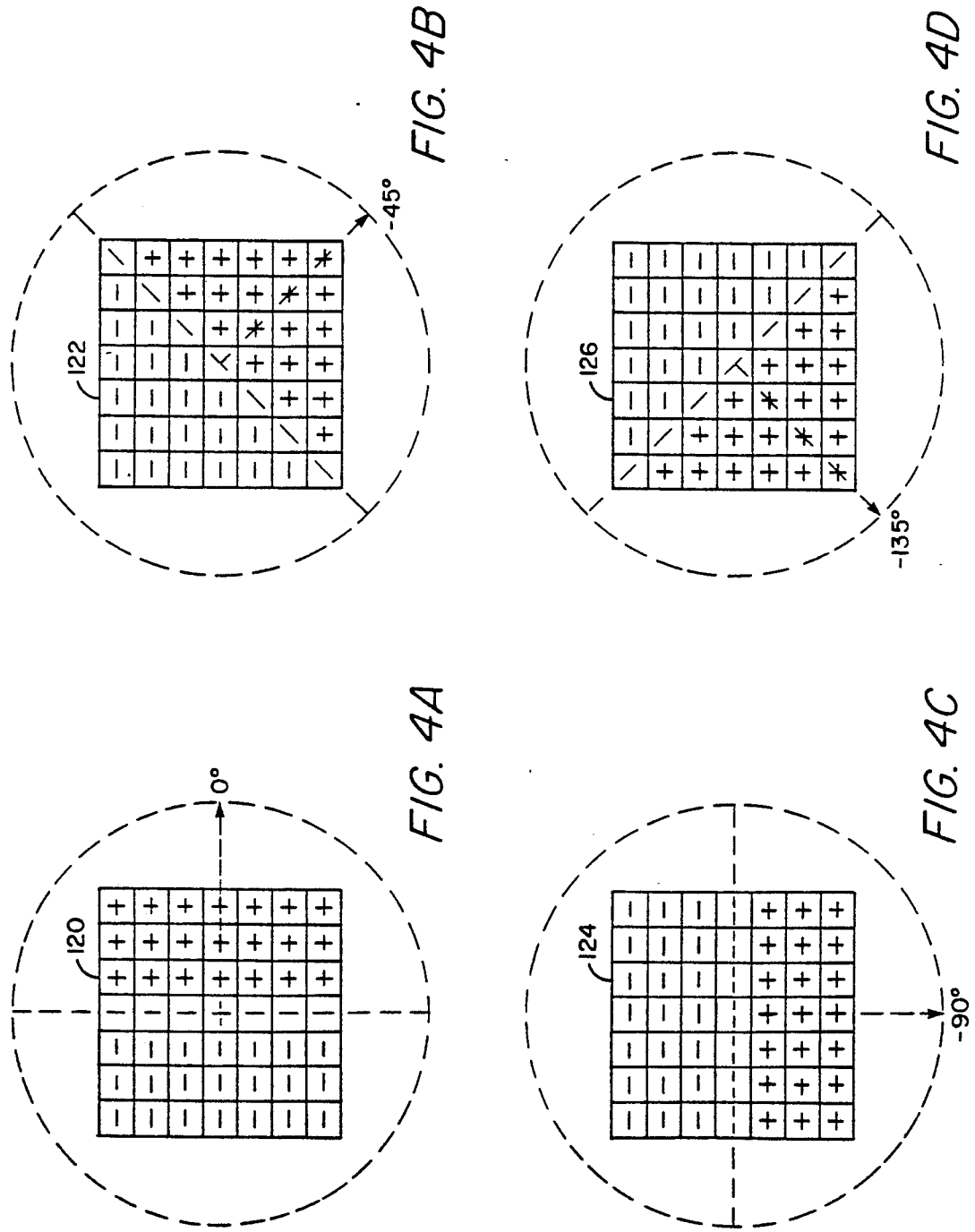

| 170A | | | | 170B | | |
|---|---|---|---|---|---|---|
| 0 | 1 | 2 | | 0 | 0 | 0 |
| 0 | 0 | 1 | | 1 | 0 | 0 |
| 0 | 0 | 0 | | 2 | 1 | 0 |

FIG. 5C

| 172A | | | | 172B | | |
|---|---|---|---|---|---|---|
| 1 | 2 | 1 | | 0 | 0 | 0 |
| 0 | 0 | 0 | | 0 | 0 | 0 |
| 0 | 0 | 0 | | 1 | 2 | 1 |

FIG. 5D

| 174A | | | | 174B | | |
|---|---|---|---|---|---|---|
| 2 | 1 | 0 | | 0 | 0 | 0 |
| 1 | 0 | 0 | | 0 | 0 | 1 |
| 0 | 0 | 0 | | 0 | 1 | 2 |

FIG. 5E

| 176A | | | | 176B | | |
|---|---|---|---|---|---|---|
| 1 | 0 | 0 | | 0 | 0 | 1 |
| 2 | 0 | 0 | | 0 | 0 | 2 |
| 1 | 0 | 0 | | 0 | 0 | 1 |

FIG. 5F

CONFIRMED BOUNDARY PATTERN MATCHING

BACKGROUND OF THE INVENTION

This invention pertains generally to image processing techniques for aligning two images, and particularly to the apparatus and method for guiding a missile to a target using image processing.

In certain military operations it is important to launch a missile from an aircraft toward a specific target on the ground. Substantial military advantage can be obtained if the missile is capable of guiding itself to the target, thereby enabling the aircraft with its human pilot to stay out of the dangerous area around the target. To achieve such a capability, the missile must have access to targeting information and must be able to identify the specific target while in flight.

In one contemplated weapons system, both the aircraft and the missile are equipped with Synthetic Aperture Radar (SAR). Generally, SARs are well known. Suffice it to say here that a SAR mounted on a flying body makes an image of objects within a field of view on the underlying ground. The image might be represented in any of a number of ways. For images that are to be further processed by a computer, the image would most likely be represented by an array of digital words, with each word describing the intensity of radar reflections from a small area within the field of view. Alternatively, an image intended to be displayed to a human would resemble a picture of the ground area taken with a photographic camera.

It is desirable in some contemplated weapons systems for a human on the aircraft to designate a specific target in the image. The portion of the image adjacent the target becomes a reference image. Image processing apparatus on the aircraft would then pass the reference image to the missile. After launch, the missile would fly toward the target, forming its own SAR images. Processing on the missile would compare the reference image with the image from the missile. The missile guidance system could use the results of the image comparisons to steer the missile toward the designated target.

However, several problems must be overcome in order for the contemplated weapons system to function. One significant problem is that as the missile approaches the target, the viewing angle changes. Correspondingly, the SAR images formed by the missile in flight will differ from the SAR image formed by the aircraft as the missile gets further from the launch point. Therefore, the image processing must be relatively insensitive to changes in viewing angle. Another problem to be overcome is that the missile must be able to process the SAR images quickly so that the missile guidance system can respond quickly to needed course changes. Additionally, it is desirable for the image processing on the missile to require relatively simple hardware since the entire missile is expendable.

SUMMARY OF THE INVENTION

It is an object of this invention to provide a signal processing technique for registering two images.

It is a further object of this invention to provide a signal processing technique to register two images when the viewing angles of the images differ.

It is another object of this invention to provide a signal processing technique for registering two images using relatively quick and simple processing.

The foregoing and other objects of this invention are obtained by processing the first of two images to create a reference template. The reference template is compared to each area of the second image to find the area of the second image matching the reference template. The reference template is formed by filtering the first image to reduce noise and enhance the contrast between difference regions in the image. Two maps are then formed from the filtered image. The first map contains an indication of the location of edges of objects in the image and is formed by finding places in the image where the intensity changes suddenly. The second map is formed by setting the intensity of each pixel in the filtered image to one of a very small number of image intensities and then indicating an edge at every pixel adjacent to a pixel of different intensity. The two maps are then compared to form a new map containing only the edges formed in both maps. Additional processing adds edges to the new map corresponding to edges appearing in only one of the maps provided those edges meet additional criteria suggesting they are true edges. The resulting map is then encoded as a template, allowing quick comparison to the second image.

More particularly, the first map is formed by operating on subarrays of pixels in the first image. Each subarray is divided into two equisized groups of adjacent pixels. The sum of the intensities of the pixels in each group is computed and the ratio between the two sums is computed. Each subarray is divided four different ways and the division which produces the largest ratio is selected. If that ratio exceeds a predetermined threshold, the pixel in the first map corresponding to the center of the subarray is set to a value indicating an edge in the direction of the dividing line between the two groups of pixels.

The second map is formed by first computing a threshold. The threshold is computed by calculating a ratio corresponding to each pixel in the first image reflecting the ratio of the intensity of that pixel compared to the pixel near it in the image with the largest difference in intensity. The average of intensities of pixels in the image with large intensities and large ratios is then computed as is the average of pixels with low intensities and large ratios. The average of the two averages forms the threshold and an edge in the second map is indicated where a pixel in the first image with an intensity on one side of the threshold is adjacent to a pixel with an intensity on the other side of the threshold.

The maps are combined into one new map containing true edges by first including in the true edge map the pixels corresponding to edges in both the first and second maps. The pixels corresponding to edges in the second map but not the first map are selected for further processing. The selected pixels are tested in much the same manner as used to identify edges and their angles in forming the first map, except different, relaxed, parameters are used to make it more likely that a pixel will be identified as an edge. If the angles of edge pixels identified with relaxed parameters are similar to the angles of adjacent pixels already identified as edges in the new map, those pixels are also added to the new map.

The reference template consists of a subarray of pixels and a correlation threshold. The subarray contains two sets of pixels which described pixels near the identified edges, the first set corresponding to pixels on the higher intensity sides of edges and the second set corresponding to pixels on the lower intensity sides of edges. The correlation threshold is computed to reflect the ratio of the average intensity of pixels in the higher intensity set to the average intensity of pixels in the lower intensity set.

The subarray comprising the template is matched to a portion of the second image by comparing the template to subarrays formed from the second image. The comparisons are performed by first computing two thresholds. The first threshold is computed by averaging the pixels in the subarray of the second image corresponding to the pixels in the template on the higher intensity sides of edges weighted by the inverse of the correlation threshold, and the second threshold is computed by averaging the pixels in the subarray of the second image corresponding to the pixels in the template on the lower sides of edges weighted by the correlation threshold. A correlation variable is then computed reflecting the number of pixels in the subarray in the second image corresponding to pixels in the higher intensity set of the template above the second threshold and the number of pixels in the subarray in the second image corresponding to pixels in the lower intensity set of the template below the first threshold. A match of the template to a subarray of the second image is made by selecting the subarray which yields the largest value of the correlation variable.

BRIEF DESCRIPTION OF THE DRAWINGS

The invention will be more fully understood from the following detailed description and the accompanying drawings in which:

FIG. 1 is a sketch of the system employing the invention;

FIGS. 4A, 4B, 4C and 4D are masks used in the processing performed by the local edge detector of FIG. 2;

FIGS. 5C, 5D, 5E and 5F are masks used in the processing of FIG. 5A;

DESCRIPTION OF THE PREFERRED EMBODIMENT

Figure 2:
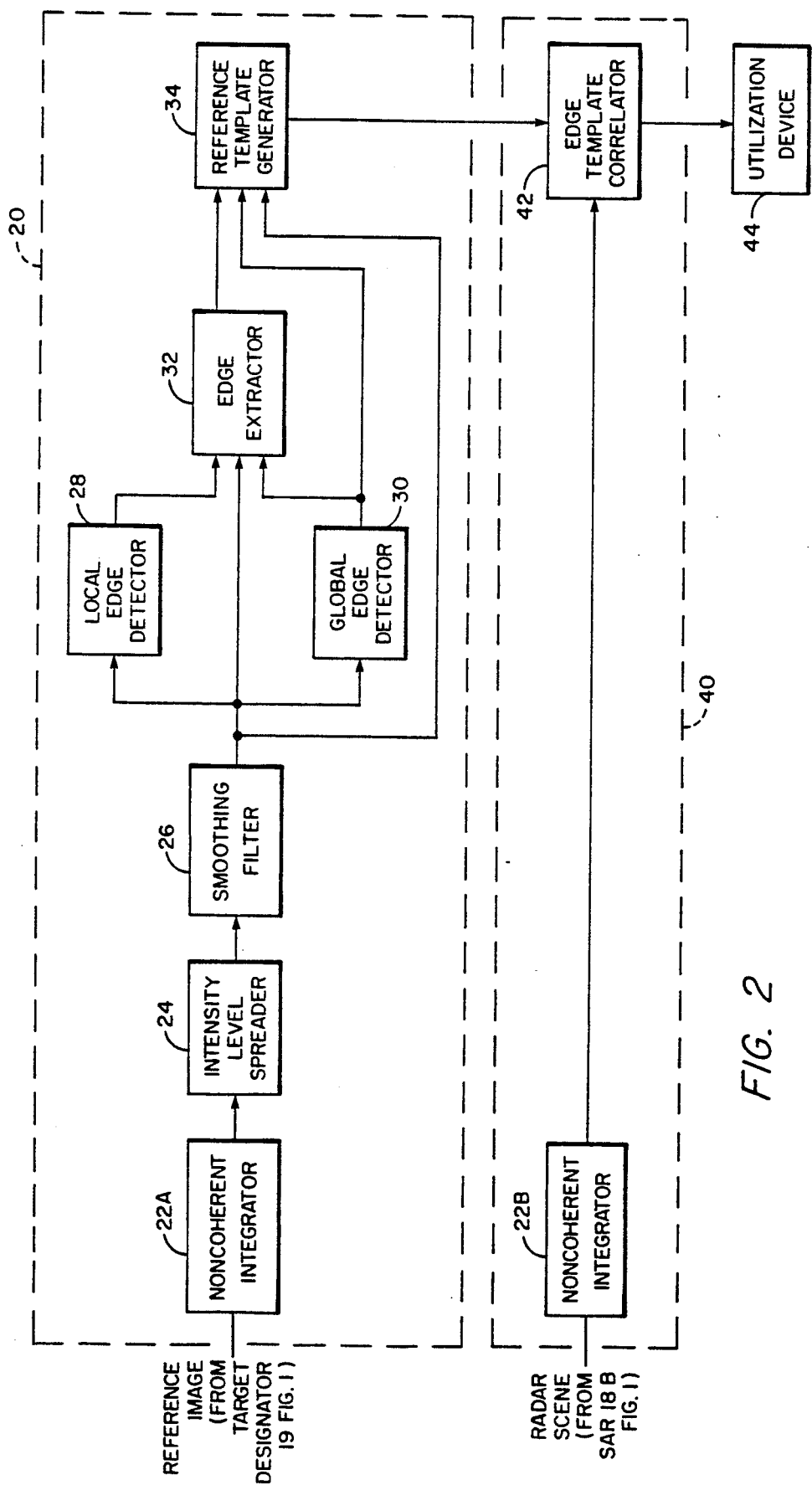
FIG. 2 is a block diagram of the processing which produces target coordinates used in guiding a missile.

FIG. 1 shows an airplane 14 armed with a missile 16. Both the airplane 14 and the missile 16 are equipped with synthetic aperture radars (SAR) 18A and 18B, respectively. Target designator 19 receives images formed by SAR 18A. Here, target designator 19 consists of a digital computer with a screen for displaying the images from SAR 18A. The target designator 19 also consists of some input means (not shown) which allows the pilot (not shown) of airplane 14 to designate a target (here a trestle T across a stream, not numbered) in the image. Target designator 19 selects an area in the image to be a reference image which is passed to on-aircraft processor 20. The area in the reference image has a fixed relationship to the target. Here on-aircraft processor 20 consists of software, described in detail below, executing on a conventional digital computer to create a template (not shown) from the SAR output signals. As shown, the SAR output signals consist of signals defining the banks of the stream (not numbered), the trestle T and other objects in the field of view such as a building and trees (not numbered). The template and the location of the target relative to the reference image are passed to on-missile processor 40 via a digital link 15 and stored in on-missile processor 40. Digital link 15 here is any known bus for passing digital information from one computer to another.

When the missile 16 is fired at the trestle T, digital link 15 is broken. As the missile 16 flies toward the trestle T, SAR 18B makes further images of the target area. On-missile processor 40 compares the template formed by on-aircraft processor 20 and stored in a missile processor 40 with each one of the images produces by on-missile processor 40 from signals from SAR 18B. On-missile processor 20 matches the template to a portion of the image produced by on-missile processor 40. The missile guidance system (not shown) then is actuated to steer the missile 16. The missile is steered towards the point on the ground having the same relationship to the portion of the image which matched the template as the target had to the reference image used to form the template. Thus, the results computed by on-missile processor 40 are useful in guiding the missile 16 to a designated target.

TERMINOLOGY

Before describing the processing performed on the SAR images, some introductory concepts and terminology are explained. The SAR image is divided into a two-dimensional array of pixels, each represented by a digital word. Here the array is taken to be 36 ×36, but one skilled in the art will recognize that the techniques described herein are applicable to various sizes and shapes of arrays. The value of each digital word corresponds to the intensity of the image at that pixel. Techniques for displaying images represented in such a fashion, as well as techniques for passing such images from one processor to another, are known.

Hereinafter, the images formed by the SAR or any processed version of that image might be referred to as simply an image. However, in processing the image, individual pixels are sometimes considered. In those cases, it is often more convenient to think of each image as a two-dimensional array of pixels. Each pixel has an x and y position in the array. An array name followed by two numbers in parentheses (e.g. SRBE(i, j)) means the pixel in the named array having that x, y position in the array.

On some occasions, a value or a group of values is associated with each pixel in an image. The array of values will also be called a "map."

In some instances an image will be processed several different ways and comparisons between the resulting images or maps are made. In some cases, the processed images may have different numbers of pixels than the unprocessed image or than each other. In comparing such images, it is important to relate the correct pixels in each image. The center pixels of the images correspond and have the same x, y array coordinates. The pixels around the center pixels also correspond. Corresponding pixels can be identified moving outward from the center of each image until corresponding pixels are identified for all the pixels in the smaller image. There are no corresponding pixels for the remaining pixels in the larger image. Results of comparisons for those pixels are undefined and are not used in further processing.

In many instances, groups of pixels in an image are selected for simultaneous consideration. One such selection technique is called a "local window." For example, if a 3 ×3 subarray of pixels is to be considered, that group is said to be in a 3 ×3 local window. The local window is centered over the pixel in the center of the window. It is often necessary to process every such group of pixels which can be formed from an image. In those instances, the local window is thought of as "sliding" across the image because the local window is centered above one pixel, then moves and is centered above another pixel, and then another, and so on. It should be noted, though, that if the local window is centered above a pixel along the side of the array, a subarray of pixels cannot be formed around that pixel because no pixels exist to one side of that pixel. Generally, when a local window is slid across an image, it is not centered above the pixels along the sides of the array because certain pixels under the window would have undefined values. However, some algorithms provide for that contingency. In those algorithms, the local window may be centered over the pixels along the sides of the array.

In some instances, a plurality of number representing ratios will be compared. When those number are compared "in a ratio sense," more is implied than just selecting the largest of the numbers. The numbers are compared as if all were positive. Additionally, the multiplicative inverses of numbers less than one are considered (i.e., all ratios are converted to positive numbers greater than one for comparison.)

PRE-PROCESSING FILTERING

Turning now to FIG. 2, additional details of the on-aircraft processor 20 and on-missile processor 40 can be seen. The operation of on-aircraft processor 20 is considered first.

Non-coherent integrator 22A, intensity level spreader 24, and smoothing filter 26 enhance the features in the image prior to formation of a template. One skilled in the art will recognize various other techniques of feature enhancement could also be used. Non-coherent integrator 22A forms an average of some number, say four, of images made by the SAR using different radar frequencies. The average is computed on a pixel-by-pixel basis (i.e., the corresponding pixels in the different images are averaged to produce the corresponding pixel in the output image).

Intensity level spreader 24 changes the intensity of each pixel in the image to concentrate the distribution of intensity levels in the image around two intensity levels. Here, each pixel is represented by a digital word which could take on a discrete number, say 256, of values representing an intensity level. The input image has some arbitrary intensity distribution which is changed by intensity level spreader 24. First, the global median intensity of all pixels in the 36 ×36 image is determined. Next, the output image of intensity level spreader 24 is formed by operating on every possible group of nine pixels selected by sliding a 3 33 3 local window across the input image. The value of the pixel in the output image corresponding to the pixel at the center of the 3 ×3 local window is calculated from the nine pixels under the local window. For each position of the local window, i.e., each group of nine pixels, the local median of the pixels in the window is computed. If the local median is less than the global median, the output pixel is set equal to the local minimum, i.e. it is assigned a value equal to the lowest intensity of all pixels in the window. Conversely, if the local median is not less than the global median, the output pixel is set equal to the local maximum. Since the local window cannot be centered over any pixel on the outer edge of the 36 ×36 array, the resulting image formed by sliding the local window over the entire input image produces a 34 ×34 output array.

Smoothing filter 26 uses the 34 ×34 output array of intensity level spreader 24 as its input array. First, the global median of the input array is computed by finding the median of all pixel values in the input array. A 3 ×3 window is slid over the input image, the pixel in the output image corresponding to the pixel at the center of the window being computed at each window position. If the center cell of the local window is greater than or equal to the global median, the pixel in the output image is set equal to the median of all pixels in the local window greater than or equal to the global median. Conversely, if the center cell in the local window is less than the global median, the pixel in the output image is set equal to the median of all pixels in the local window less than or equal to the global median. The resulting filtered image is described by a 32 ×32 array of pixels and will hereinafter also be described as the EPS image.

In alternative embodiments of the intensity level spreader 24 and smoothing filter 26, the filtered image could have the same number of pixels as the reference image. For example, the pixels near the edge of the reference image which are not processed because no local window can be centered above them might simply be copied unchanged in to the filtered image.

The filtered image is then processed by local edge detector 28 and global edge detector 30. Each produces an edge map. The edge maps are represented as arrays of digital words, like the filtered image. The value of each word is assigned by local edge detector 28 or global edge detector 30 to indicate whether or not the corresponding pixel in the filtered image depicts an edge between two objects in the image. Local edge detector 28 and global edge detector 30 use different processes to identify edges in the input image. Thus, the resulting edge maps may differ. Edge extractor 32 combines both edge maps, using information from the filtered image, into a confirmed edge map. The confirmed edge map contains edges likely to represent true edges. Reference template generator 34 uses the confirmed edge map to create the template it passes to on-missile processor 40 where it is compared to images formed by SAR 18B by edge template correlator 42 to locate the target. The operation of each of these elements is described in detail below.

GLOBAL EDGE DETECTOR

Figure 3A:
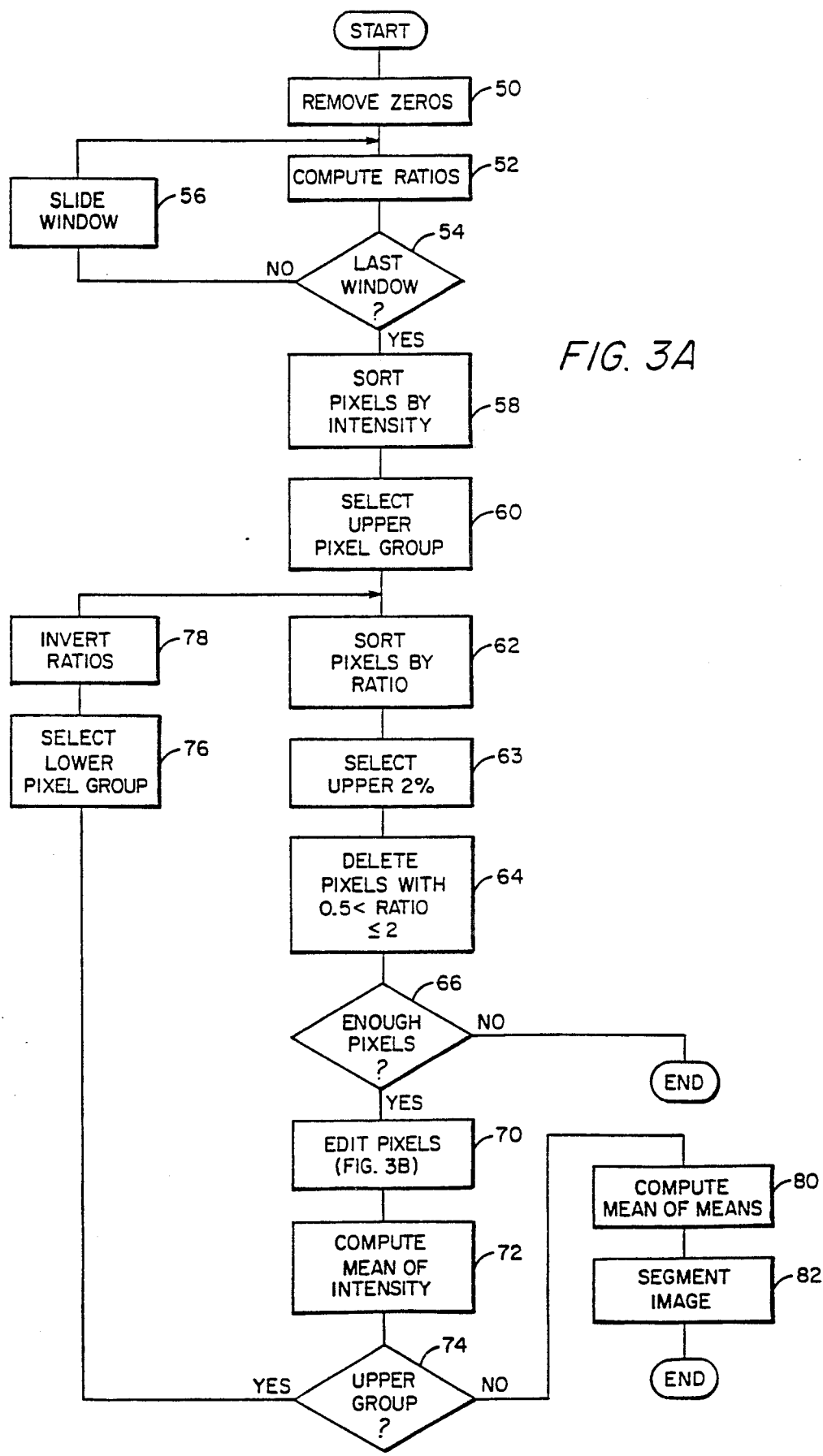
FIG. 3A is a flow diagram of the processing performed by the global edge detector in FIG. 2.

FIG. 3A shows a flow diagram of the processing performed in global edge detector 30 to produce a global edge map, hereinafter also called the SRBE map. The rectangular elements (typified by element 50), herein denoted "processing blocks," represent computer software instructions or groups of instructions. The diamond-shaped elements (typified by element 54), herein denoted "decision blocks," represent computer software instructions or groups of instructions which affect the execution of the computer software instructions represented by the processing blocks. The flow diagram does not depict syntax of any particular computer programming language. Rather, the flow diagram illustrates the functional information one skilled in the art requires to generate computer software to perform the processing required of global edge detector 30. In should be noted that many routine program elements, such as initialization of loops and variables and the use of temporary variables, are not shown.

As can be seen in FIG. 2, global edge detector 30 processes the filtered image created by smoothing filter 26. At the start of the processing shown in FIG. 3A, the image is represented by a 32 × 32 array of digital words, i.e. pixels. Global edge detector 30 converts the pixels in the image to one of two values (hereinafter called binarization), depending on whether the pixel intensity is above or below a threshold. An edge is indicated at every point in the image where a pixel of one value is adjacent to a pixel of the other value. As will be seen in conjunction with FIG. 3A and FIG. 3B, an important aspect of global edge detector 30 is the selection of an appropriate threshold for binarization of the image.

Turning now to FIG. 3A, processing block 50 changes any pixel having a value of zero to have a value of 0.1. Undefined values which could result from division by zero when the pixels values are used to compute ratios are thereby avoided.

Processing blocks 52 and 56 and decision block 54 implement a loop where ratios corresponding to pixels in the image are computed. A 3 ×3 local window is slid across the input image and a ratio is computed for the center pixel at processing block 52. The ratio equals the ratio of the intensity of the center pixel to either the third highest intensity or the third lowest intensity of the other pixels in the local window, depending on which is larger in a ratio sense. Decision block 54 checks if every possible 3 ×3 group of pixels in the image has been used to compute a ratio. If every possible group of pixels has not been used, processing block 56 selects the next group and processing block 52 and decision block 54 are repeated. When decision block 54 determines all groups of pixels have been used, a ratio has been associated with each pixel except those on the edges of the image.

Processing block 58 sorts the pixels in the image by intensity. One skilled in the art will recognize that processing block 58 can operate using any known sorting techniques, such as a bubble sort or shell sort. The output of processing block 58 does not depend on the locations of the pixels in the image, but the original image is retained for further processing. However, the ratios computed at processing block 52 are still associated with the sorted pixels computed at processing block 58.

Processing block 60 selects pixels with intensity values in the thirty-fifth to nintieth percentiles which are used to compute, in a manner described below, an upper mean, i.e., the mean of pixels likely to be above the optimum threshold. Processing block 62 reorders the selected pixels in two groups: first, those pixels, which when used to form a ratio at processing block 52, had an intensity higher than the other pixel selected to form the ratio; and second, those pixels, which when used to form a ratio at processing block 52, had an intensity lower than the other pixel selected to form the ratio. Within each group, the pixels are further ordered such that the pixels with larger ratios in a ratio sense precede those with smaller ratios. Processing block 63 selects for further processing the upper 2% of the pixels ordered by processing block 62.

Processing block 64 deletes from consideration pixels with ratios between 0.5 and 2.0. Decision block 66 checks that the deletion at processing block 64 left a sufficient number of pixels for further processing. If less than 1%, i.e., one-half of the pixels selected at processing block 63, remain, processing by global edge detector 30 (FIG. 2) ends. This termination corresponds to the occurrence of an exception condition. Empirical evidence indicates that when the exception condition occurs there is little likelihood of finding good edges or boundaries in the input image. Once the exception condition occurs, target designator 19 might select a different reference image and that image would be processed starting with noncoherent integrator 22A (FIG. 2).

Figure 3B:
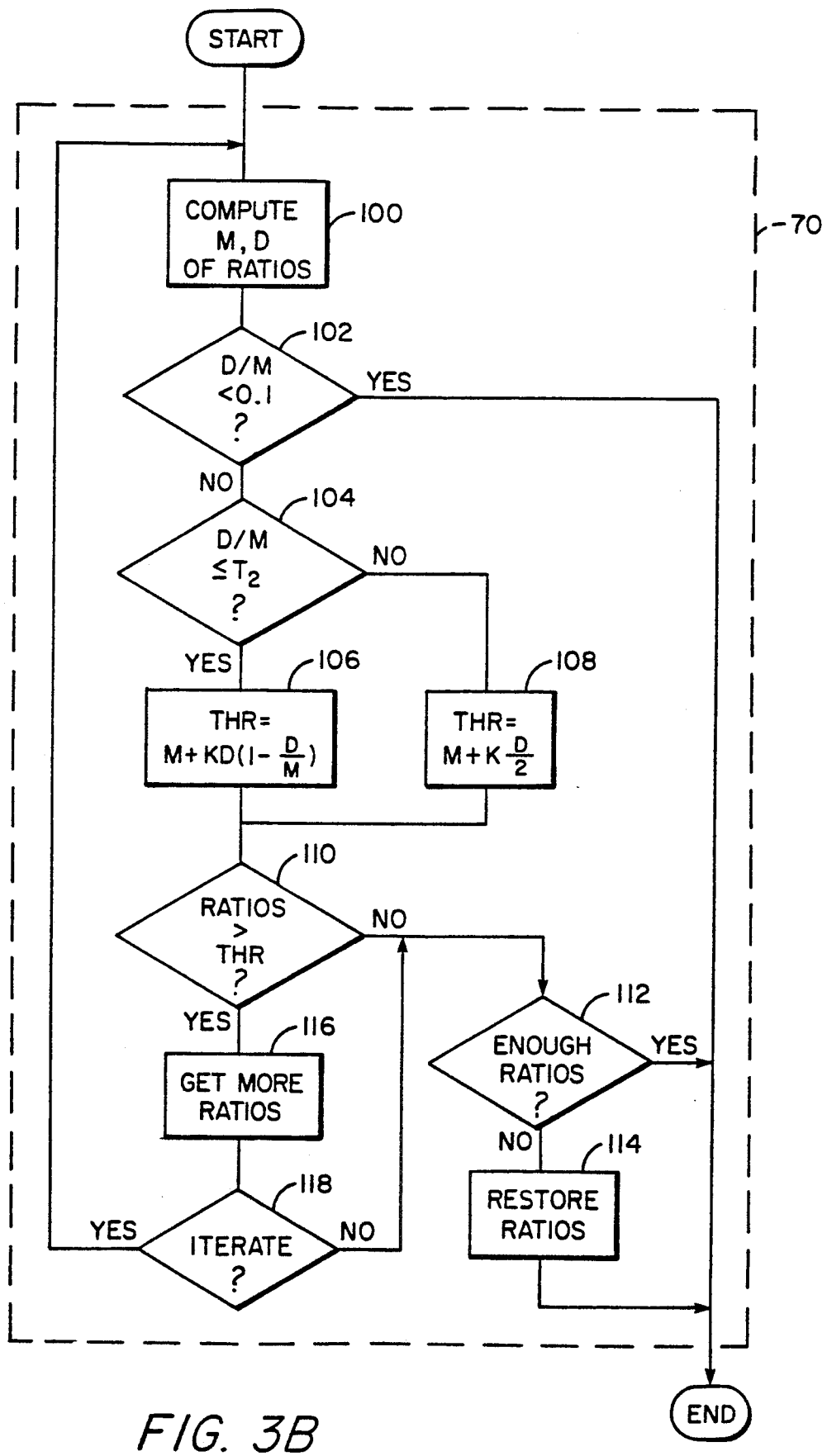
FIG. 3B is a flow diagram of the processing performed by the template editor in the global edge detector of FIG. 3A.

Provided processing did not terminate after decision block 66, processing block 70 edits the pixels selected by processing block 63. FIG. 3B shows the details of processing block 70. The processing shown in FIG. 3B has the beneficial effect of removing pixels corresponding to singularities rather than true edges from consideration in setting the threshold.

Processing block 100 computes the mean and standard deviation, using known methods, of the ratios of the selected pixel values. The inverse of any pixel less than 1 is used for the computation.

Decision block 102 determines if the ratio of the standard deviation to the mean is less than 0.1. If that ratio is less than 0.1, processing in processing block 70 ends. If not, processing continues to decision block 104 where it is determined if the ratio of the standard deviation to the mean is less than, or equal to, some threshold $T_2$, here taken to be 0.5. If it is, processing block 106 computes a second threshold level, THR, according to the formula:

$$THR = M + KD\left(1 - \frac{D}{M}\right)$$

where
 M is the mean,
 D is the standard deviation, and
 K is a constant, here equal to 2.
Otherwise, THR is computed at processing block 108 according to the formula:

$$THR = M + K\frac{D}{2}$$

Decision block 110 then checks if any of the input ratios exceed the threshold calculated at either processing block 106 or 108. If ratios exceed the threshold, processing block 116 eliminates those ratios from further processing and adds additional ratios to take their place. Recall that processing block 63 (FIG. 3A) selected only the upper 2% of a list of ratios sorted by value. Processing block 116 replaces the eliminated ratios with the next ones in that list provided the ratios in the list exceed a minimum value of 2.0

Decision block 118 decides if the processing shown in FIG. 3B should be repeated again. If the processing has been performed less than a maximum number of times, here three, and if more than one-half the number of ratios selected at processing block 63 (FIG. 3A) remain, the processing in FIG. 3B repeats at processing block 100 using the edited list of ratios. Otherwise, processing ends. Processing could also end after decision block 110 if no ratios exceed the threshold THR. Decision block 112 checks that at least 1% of the pixels remains in the list, i.e., one-half of the pixels originally selected at processing block 63 (FIG. 3A). If a sufficient number of pixels remains, processing in processing block 70 ends. Otherwise, processing block 114 adds previously removed ratios back to the list, in the opposite order to which they were removed, until the list contains a number of pixels equal to one-half of the number of pixels selected at processing block 63 (FIG. 3A). The need for processing block 114 occurs because processing block 116 will not add pixels to the list which do not have a ratio of at least 2.0. Thus, in some instances, fewer than 1% of the pixels might remain when decision block 118 is reached.

Returning to FIG. 3A, it can be seen that the edited list of ratios is used by processing block 72. The intensity levels corresponding to the pixels in the edited list are averaged to create a mean value. The process of computing a mean is repeated twice, once using the upper pixel group selected at processing block 60 and once using a lower pixel group selected at processing block 76. Decision block 74 determines if the processing has been repeated for the lower pixel group. If not, processing block 76 selects the pixels with intensity values in the tenth through sixty-fifth percentile. The selection is simplified by the fact that processing block 58 already sorted the pixels by intensity. The ratios corresponding to the selected pixels are then inverted at processing block 78 and processed just like the upper pixel group. It should be noted that for the lower pixel group, processing block 62 orders the pixels into two groups, as above, except that those pixels which were used to form a ratio at processing block 52, had an intensity lower than the other pixel selected to form the ratio precede those pixels which had a value higher than the other pixel selected to form the ratio. After processing of the lower pixel group, however, decision block 74 recognizes the lower group has been processed and processing continues at processing block 80.

Processing block 80 computes the average of the two means computed at processing block 72, ie., one for the upper pixel group and one for the lower pixel group. This "means of means" is used at processing block 82 as a threshold to segment the image. The pixels in the global edge map corresponding to values in the input image above the threshold are set to "4," those below the threshold to "1". Hereinafter, the global edge map at the output of global edge detector 30 will also be called a segmented or binarized image or designated SRBE. A specific pixel in the segmented image will be denoted SRBE(i, j).

In an alternative processing scheme, the process of determining a threshold could be repeated twice more to create three thresholds before segmenting the image at processing block 82. The second threshold is determined by essentially repeating the processing shown in FIG. 3A and FIG. 3B on the group of pixels above the "mean of means" threshold computed at processing block 80. The third threshold is determined by essentially repeating the processing shown in FIG. 3A and FIG. 3B on the group of pixels below the "mean of means" threshold computed at processing block 80. Segmentation of the image at processing block 82 would then consist of assigning a number between 1 and 4 to each pixel in the input image. A value of 1 would be assigned if the pixel intensity were below all three thresholds; a value of 2 if it were below two of the three; a value of 3 if it were below only one of the three threshold; and a value of four if it were above all three thresholds. Edges would be identified when adjacent pixels had different values. Alternatively, edges might be identified only when the values assigned to adjacent pixels differ by two or more.

LOCAL EDGE DETECTOR

Returning briefly to FIG. 2, it can be seen that local edge detector 28 operates on the same input image as global edge detector 30. The output of local edge detector 28 is used by edge extractor 32 just like the output of global edge detector 30. The processing represented by local edge detector 28 could therefore be performed at the same time as the processing of global edge detector 30. If both processes are performed using one general purpose digital computer, the processes will likely be performed one after the other.

In local edge detector 28, a 7 ×7 local window is slid over the 32 ×32 pixel input array. An output edge map with 26 ×26 pixel is formed by assigning a value to the pixel in the edge map corresponding to the pixel in the center of the 7 ×7 local window. The pixel value in the edge map indicates whether that pixel corresponds to an edge in the input image and the orientation of that edge.

The processing needed to identify an edge and its orientation can be better understood by reference to FIGS. 4A, 4B, 4C and 4D. Each of those FIGURES shows a 7 ×7 pixel window with some pixels designated "+" and others designated "−". The windows thus designated are called "masks." As the window is slid across the input array, two sums are computed at each window location: one of all the pixels corresponding to a "+" in the mask and one of all the pixels corresponding to a "−" in the mask. The ratio of these two sums is computed. The masks in FIGS. 4A, 4B, 4C and 4D are applied sequentially at each window location, yielding four ratios. The largest ratio, in a ratio sense, is selected. If the selected ratio is larger, in a ratio sense, than some threshold, here 2, the pixel in the local edge map is set to +1, indicating an edge. The angle orientation of the edge is determined from the mask corresponding to the largest ratio and whether or not an inverse ratio was selected. The masks in FIGS. 4A, 4B, 4C and 4D are associated with the angles 0°, −45°, −90° and −135°, respectively. If the selected ratio is greater, in an absolute sense, than the threshold, the angle of the mask is the angle associated with the pixel in the output edge map. If the selected ratio if less, in an absolute sense, than the threshold, the negative of the angle of the mask is the angle associated with the pixel in the output edge map. Finally, local edge detector 28 eliminates from the local edge map any pixel indicating an edge but not adjacent to another pixel indicating an edge at an angle within 45° of the angle of the first pixel. Hereinafter, the output of local edge detector 28 will also be designated AED and a specific pixel in the image will be designated AED (i, j).

EDGE EXTRACTOR

Referring again to FIG. 2, it can be seen that the edge map produced by local edge detector 28, the segmented image produced by global edge detector 30, and the filtered image produced by smoothing filter 26 are inputs to edge extractor 32. Edge extractor 32 combines the information from all three sources to make a confirmed edge map containing edges which will likely be easily recognized in the images processed by on-missile processor 40. Details of the processing performed by edge extractor 32 are shown in FIGS. 5A through 5F and FIG. 6.

Edge extractor 32 (FIG. 2) first forms an edge/-boundary cross-correlated map from the AED map produced by local edge detector 28 and the SRBE image produced by global edge detector 30. Each pixel in the edge/boundary cross-correlated map, designated EBCC(i, j), is computed according to the following equation:

$$EBCC(i,j) = IS(i,j) \text{ AND} \quad \text{Eq. (1)}$$
$$[AED(i,j) \text{ OR } AED(i+1,j)$$
$$\text{OR } AED(i,j+1)$$
$$\text{OR } AED(i-1,j)$$
$$\text{OR } AED(i,j-1)]$$

where $$IS(i,j) = [(SRBE(i,j) \neq SRBE(i+1,j)) \text{ OR}$$
$$(SRBE(i,j) \neq SRBE(i,j+1)) \text{ OR}$$
$$(SRBE(i,j) \neq SRBE(i-1,j)) \text{ OR}$$
$$(SRBE(i,j) \neq SRBE(i,j-1))].$$

IS(i, j) is a logic 1 (i.e., a Boolean true) when a pixel SRBE(i, j) in the output image of global edge detector 30 differs from any of the neighboring pixels in that image. The term in square brackets in Eq. 1 is a logic whenever any of the pixels in the AED map corresponding to SRBE(i,j) or any of its neighbors is a logic 1(i.e., an edge). The EBCC image thus contains a 1 in every pixel where both local edge detector 28 and global edge detector 30 identified an edge and a 0 (i.e., a Boolean false) in all other pixels.

Edge extractor 32 next forms a difference map, designated "D", with any individual pixel in the map designated D(i, j). Each pixel in the difference map is computed according to the equation $$D(i,j) = \begin{cases} 1 \text{ if } IS(i,j) = 1; EBCC(i,j) = 0 \\ 0 \text{ otherwise} \end{cases} \quad \text{Eq. (2)}$$

where IS(i, j) has the same meaning as in Eq. (1). Each pixel in the D map with a value of 1 indicates global edge detector 30 reported an edge at that pixel, but local edge detector 28 did not.

Figure 5A:
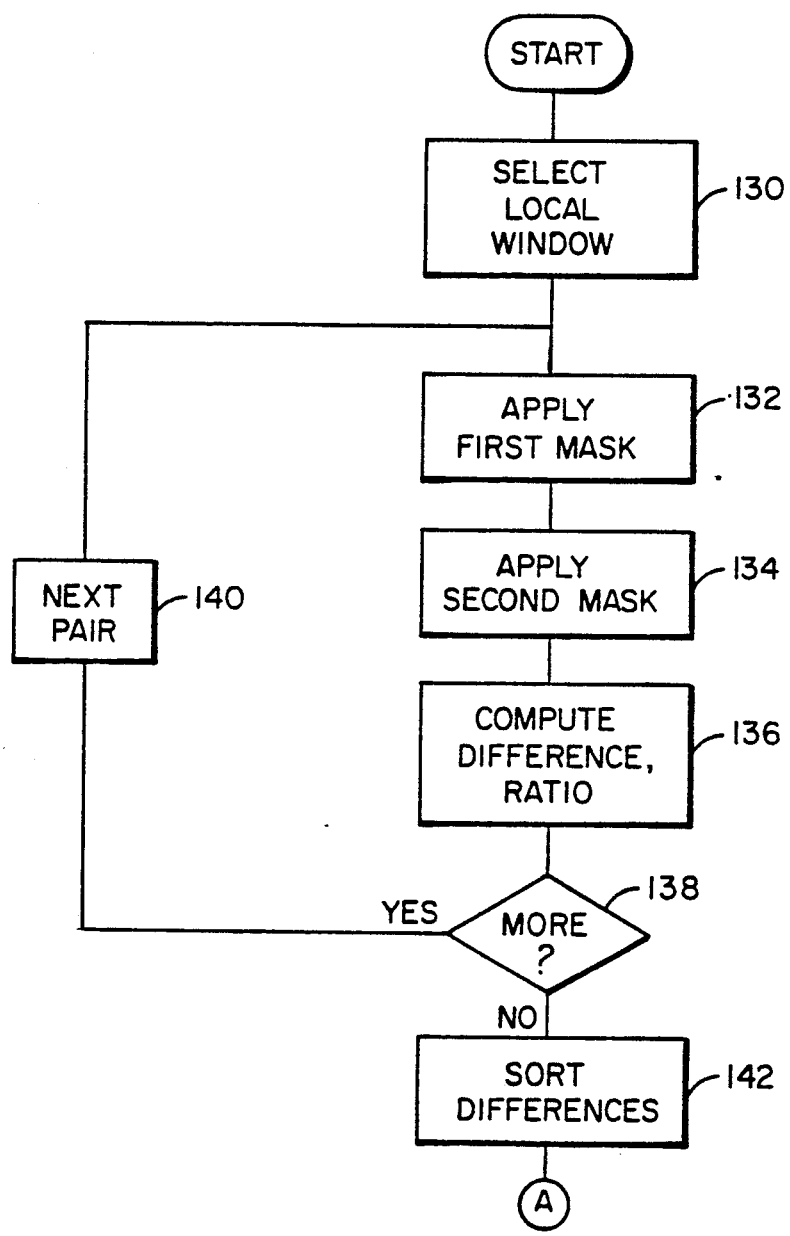
FIG. 5A is the first portion of a flow diagram of the processing performed by the edge extractor in FIG. 2 to form an alternative ratio image.
Figure 5B:
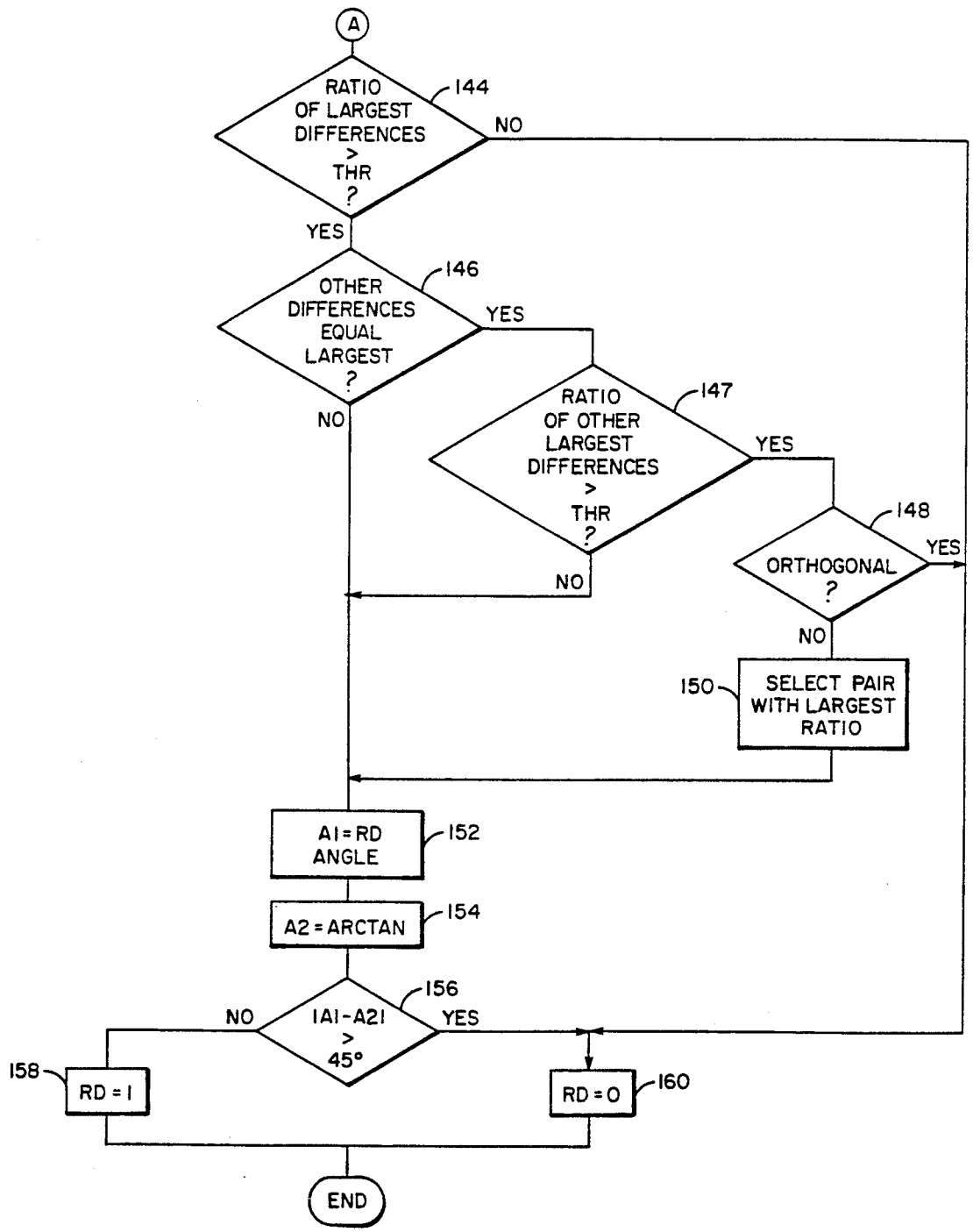
FIG. 5B is the continuation of the flow diagram of FIG. 5A.

Edge extractor 32 also forms an alternate ratio map, RD. The alternate ratio map indicates where local edge detector 28 would have reported an edge if less stringent edge detection methods had been used. FIGS. 5A and 5B show the processing performed to create the RD map. The processing is performed once for each pixel set to 1 in the D map. Processing block 130 selects a 3 ×3 local window from the EPS map. The local window consists of the pixels centered around the pixel corresponding to the pixel set to 1 in the D map. The local window is then operated on by pairs of masks depicted in FIGS. 5C, 5D, 5E and 5F. Processing block 132 applies the first mask in each pair to the selected local window. Each number in the mask is multiplied by the value of the corresponding pixel of the EPS image in the selected local window. The sum of the products is the value corresponding to that mask. Processing block 134 applies the second mask in the pair in the same fashion. Processing block 136 then computes the difference and ratio of the values computed at processing blocks 132 and 134. If each of the four pairs of masks shown in FIGS. 5C, 5D, 5E and 5F has not been applied to the local window, processing block 140 selects the next pair and values are calculated for that pair.

Processing block 142 sorts the absolute values of the differences computed at processing block 136. Decision block 144 checks if the ratio corresponding to the largest difference found at processing block 142 exceeds a threshold THR, here 2.0. In the event that more than one mask pair produced differences at processing block 136 equal to the largest, the ratios corresponding to all the pairs with that difference are checked by decision block 144 to determine if any of their ratios exceed the threshold. If the threshold is not exceeded, the pixel in the RD map corresponding to the pixel in the D map set to 1 is set to 0 at processing block 160. If the threshold THR is exceeded, decision block 146 diverts execution to decision block 147 if more than one mask pair produced differences equal the largest differences or to processing block 152 if a single mask pair produced the difference equal to the largest differences. Decision block 147 checks all the ratios corresponding to the mask pairs producing differences equal to the largest. If only one of the ratios corresponding to the largest differences exceeds the threshold THR, processing continues at processing block 152. Otherwise, processing continues at decision block 148. Decision block 148 checks if any two of the largest values were produced by an orthogonal pair of masks. The pair of masks 170A and 170B (FIG. 5C) is orthogonal to the pair of masks 174A and 174B (FIG. 5E). The pair of masks 172A and 172B (FIG. 5D) is orthogonal to the pair of masks 176A and 176B (FIG. 5F). If the differences include those produced by an orthogonal set of masks, the pixel in the RD image is set to 0 at processing block 160. Otherwise, processing block 150 selects one of the largest values by choosing the pair with the largest ratio as computed at processing block 136.

Processing then continues at processing block 152. If at decision block 146 only one largest difference was identified or at decision block 147 only one largest difference with a ratio exceeding the threshold THR was identified, processing likewise continues at processing block 152. At processing block 152 and edge angle, $A_1$, is selected based on the mask pair with the largest difference computed at processing block 136 or the pair selected at processing block 150 if that processing block was executed. For that pair, the mask producing the largest value at processing block 132 or processing block 134 is identified and the angle associated with that mask is chosen. The angles of 45°, 90°, 135°, 180°, 225°, 270°, 315° and 360° are associated with masks 170A (FIG. 5C), 172A (FIG. 5D), 174A (FIG. 5E), 176A (FIG. 5F), 170B (FIG. 5C), 172B (FIG. 5D), 174B (FIG. 5E) and 176B (FIG. 5F), respectively.

Processing block 154 computes a second angle, $A_2$, equal to the arctangent of the ratio of the difference computed at processing block 136 for the masks in FIG. 5D to the difference computed for the masks in FIG. 5F. The signs of the differences are taken into account so that the arctangent, $A_2$, can take on any value between 0° and 360°. The difference computed for the mask pair in FIG. 5D reflects the strength of an edge in a 90° direction and the difference computed for the mask pair in FIG. 5F reflects the strength of an edge in a 360° (or 0°) direction. Thus, the arctangent of the differences reflects the angle of an edge.

Decision block 156 determines if the absolute value of the difference of the angles $A_1$ and $A_2$ computed at processing blocks 152 and 154 is greater than 45°. It will be recalled that $A_1$ and $A_2$ reflect the angle of an edge at the selected pixel computed two difference ways. If the difference is greater than 45°, the pixel in the RD map is set to 0 at processing block 160 (i.e. the selected pixel is not indicated as a possible edge in the RD map). Otherwise, the pixel is set to 1 at processing block 158. The complete Rd map is formed by repeating the above-described processing (as shown in FIGS. 5A and 5B) for each pixel equal to 1 in the D image.

Figure 6A:
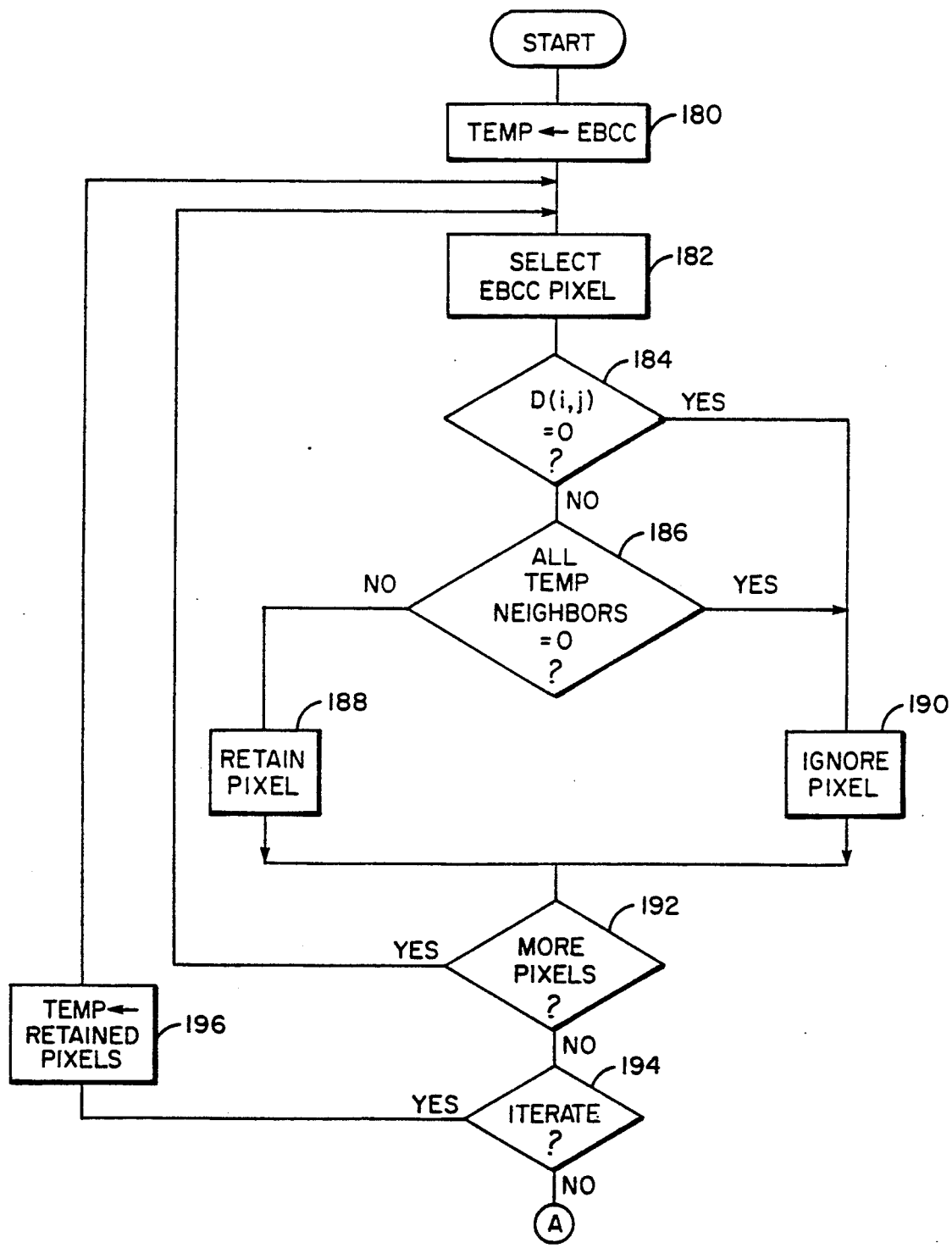
FIG. 6A is the first portion of a flow diagram of the processing performed by the edge extractor in FIG. 2 to form an edge extended boundary image.
Figure 6B:
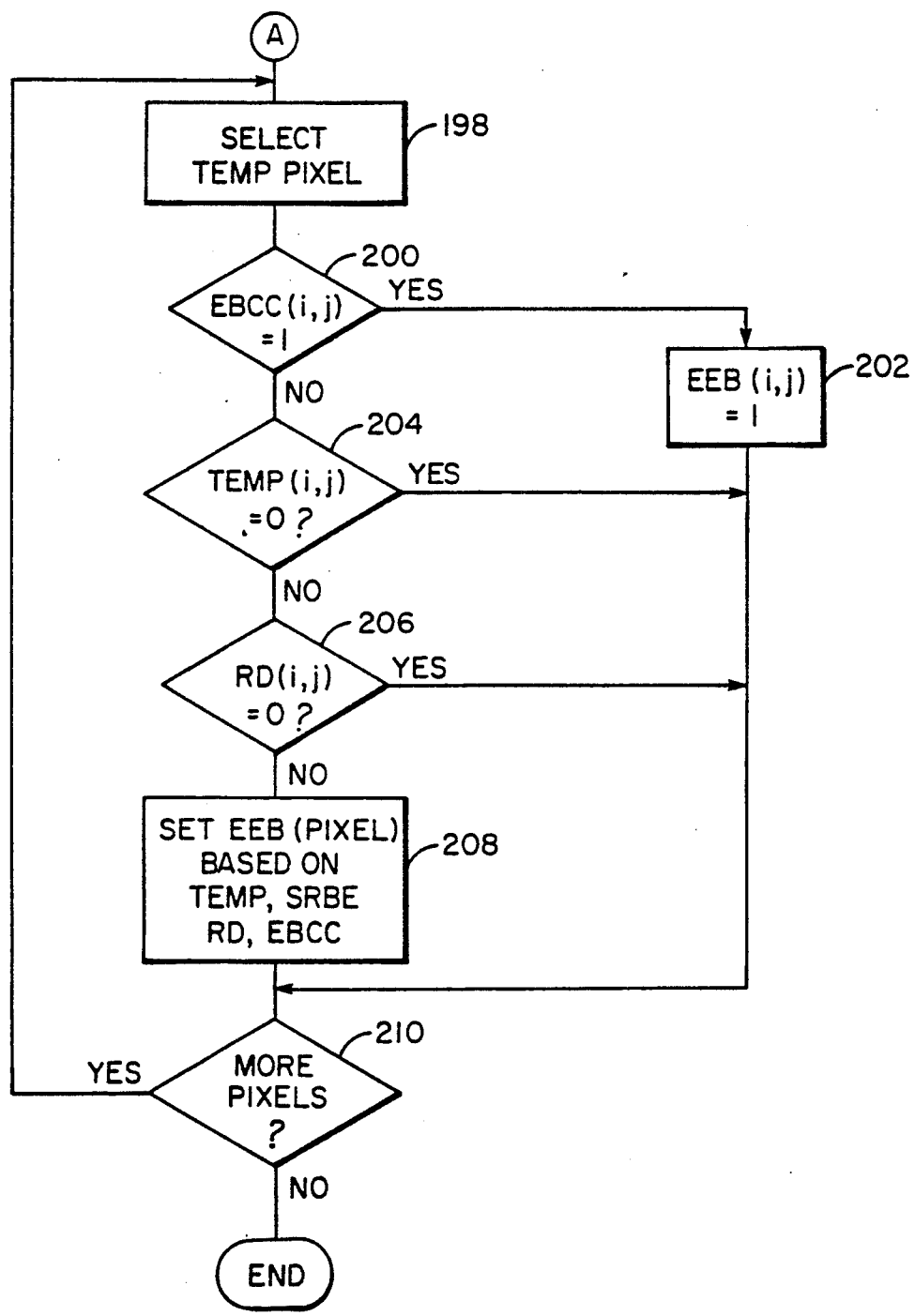
FIG. 6B is the continuation of the flow diagram of FIG. 6A.

FIGS. 6A and 6B provide more details on how the output of edge extractor 32 (FIG. 2) is formed from the EBCC, D, SRBE and RD maps. The output of edge extractor 32 (FIG. 2) consists of an array of pixels denoted EEC(i, j). Each pixel has a value of either 1, indicating an edge, or 0, indicating no edge. The processing shown in FIGS. 6A and 6B sets to 1 each pixel in the EEB map corresponding to pixels in the D map which likely represent edges are also set to 1.

At processing block 180 the EBCC map is copied to an array variable denoted "TEMP." The TEMP array is processed one pixel at a time, with the current pixel to be processed selected by processing block 182. Decision block 184 checks if the pixel in the D map corresponding to the selected pixel is 0. If the pixel equals, 0, processing block 190 ignores the selected pixel and the next pixel is considered.

On the other hand, if the pixel is not 0, it might represent an edge. Decision block 186 checks the selected pixel and its four nearest pixels in the TEMP array. The four nearest neighbors are the pixel above, below and to either side of the selected pixel in the two-dimensional array. If all those pixels are 0, the selected pixel is removed from further consideration as an edge at processing block 190 and the next pixel is selected. If any one of the four nearest neighbor pixels is other than 0, (i.e., an edge) processing block 188 retains the selected pixel for further processing as a possible edge.

If, as determined at decision block 192, more pixels remain to be processed, processing block 182 selects the next pixel which is similarly processed. If all pixels in the image have been processed, decision block 194 determines if the selection process should be repeated. The process will be repeated if two conditions are satisfied: (1) the full array has been processed less than fifty times; and (2) the group of retained pixels at the current iteration is different than the group of retained pixels at the last iteration. If, as determined at decision block 194, another iteration is to be performed, processing block 196 sets the pixels in the TEMP array corresponding to the retained pixels equal to 1 and all other pixels to 0.

Thus, the TEMP array begins with all pixels where an edge was detected by both Local Edge Detector 28 and Global Edge Detector 30 indentified as possible edges. Additional pixels, which might represent edges as indicated by a 1 in the D map, are added at each iteration to TEMP array if they are adjacent to a pixel already identified as a possible edge. Once a sufficient number of iterations, as determined at decision block 194, has been performed, the retained pixels, i.e, the 1's in the TEMP array, represent pixels which might be edges.

All the pixels retained in the TEMP array will be considered to determine which pixels actually represent edges and should appear in the EEB map at the output of edge extractor 32 (FIG. 2). Processing block 198 selects one pixel at a time for processing. If, as determined at decision block 200, that pixel in the EBCC map equals 1, processing block 202 sets the corresponding pixel in the EEB map to 1 and the next pixel is processed. If the selected pixel in the EBCC map is 0, decision block 204 checks if the corresponding pixel in the TEMP array is 0, i.e. is not in consideraton as a pixel representing an edge. If the pixel in TEMP array is 0 that pixel is ignored and the next pixel is considered.

Conversely, if the pixel in the TEMP array is 1, the corresponding pixel in the alternate ratio map, RD, is considered. If, as determined at decision block 206, the pixel in the RD map is 0, the next pixel will be considered. If the pixel in the RD map is not zero, processing block 208 will determine if the corresponding pixel in the output array EEB should be set to 1 using the equation:

$$EEB(\text{pixel}) = TEMP(\text{neighbor}) \text{ AND} \quad \text{Eq. (3)}$$
$$[SRBE(\text{neighbor}) = BRBE(\text{pixel})]$$
$$\text{AND } [(RD(\text{neighbor}) \text{ OR } EBCC(\text{neighbor})]$$

where "pixel" refers to a pixel corresponding to the selected pixel and "neighbor" refers to a pixel next to the pixel corresponding to the selected pixel. It should be noted that each pixel has eight neighbors—one on each of the four sides and each of the four diagonals. Thus, the right side of Eq. (3) must be evaluated up to eight times, once for each neighboring pixel, and EEB (pixel) will be a logic 1 is the right side evaluates to a logic 1 for any of the eight neighbors. If, as determined by decision block 210, more pixels remain, processing block 198 will select the next pixel and the processing will be repeated.

At the termination of processing shown in FIG. 6B, the EEB image contains a 1 in every pixel where both local edge detector 28 (FIG. 2) and global edge detector 30 (FIG. 2) reported an edge. In addition, the results of the processing shown in FIG. 5A were used at decision block 206 and processing block 208 to identify and set to 1 other pixels which are likely to represent extensions of the confirmed edges. The EEB image thus represents the edges in the reference image which represent image features likely to match subsequent images, possibly taken from different angles, of the target area. Those 1's in the EEB image represent confirmed edges.

REFERENCE TEMPLATE GENERATOR

Reference template generator 34 (FIG. 2) creates a template from the description of edges in the EEB map. The template is a two-dimensional array of the same size as the EEB map. Reference template generator 34 assigns to each element in the template either $+1$, $-1$ or 0, based on the edge information contained in the EEB map and segmentation information in the SRBE map. Reference template generator 34 (FIG. 2) assigns $+1$ to those pixels within three (or some other relatively small number) pixels of a confirmed edge which will likely correspond to high intensity pixels when the template array is aligned over a SAR image of the target area and $-1$ to the pixels within three pixels of a confirmed edge which will likely correspond to low intensity pixels when the template array is aligned over the SAR image. Pixels not within three pixels of a confirmed edge are assigned a value of 0. Reference template generator 34 (FIG. 2) also computes a correlation threshold, k, which is used by the edge template correlator 42 (FIG. 2) in matching the template to a SAR image taken by SAR 18B (FIG. 1) as missile 16 (FIG. 1) flies toward its target.

Figure 7A:
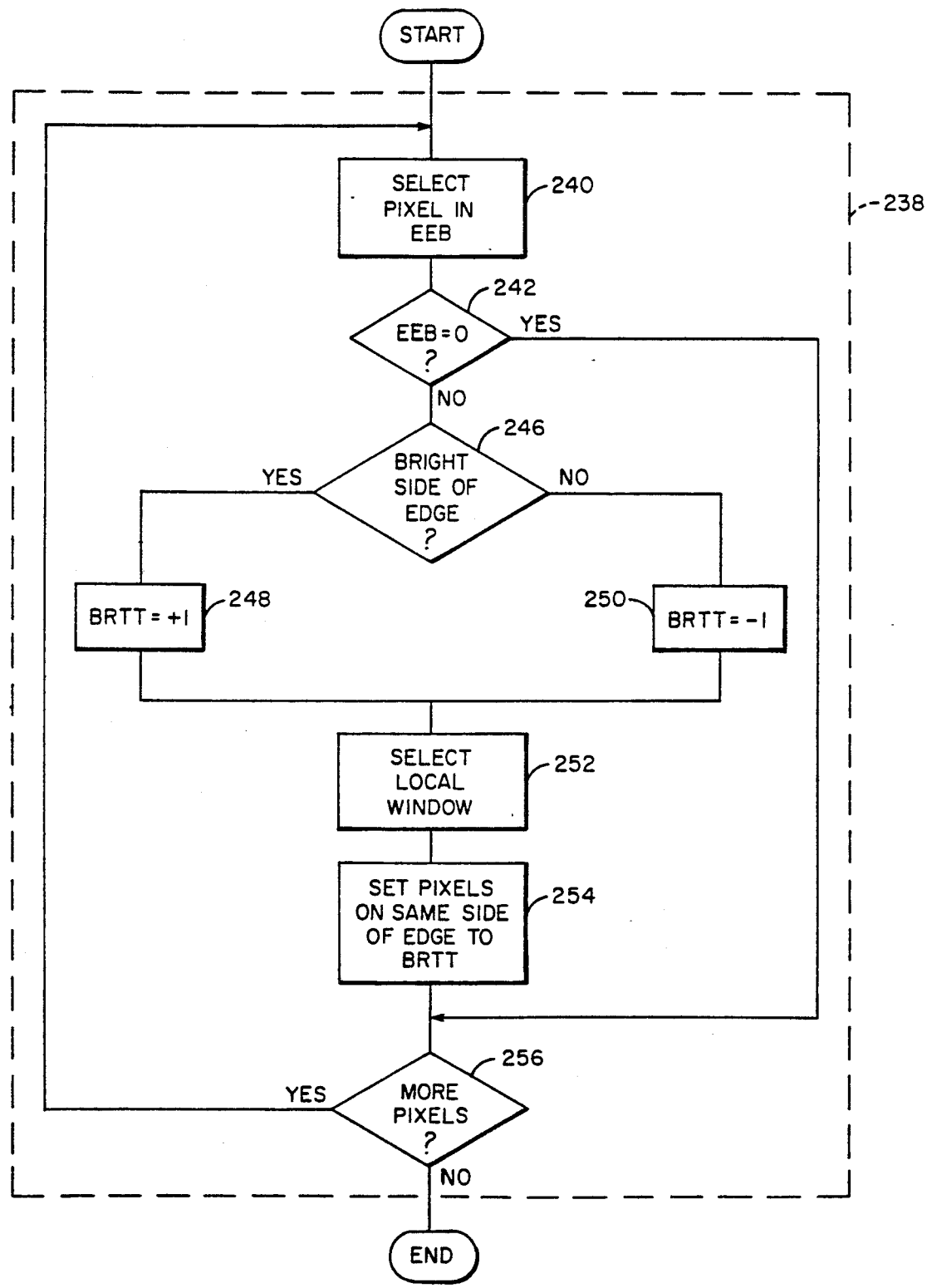
FIG. 7A is a flow diagram of the processing performed by the reference template generator in FIG. 2 to form a reference template.
Figure 7B:
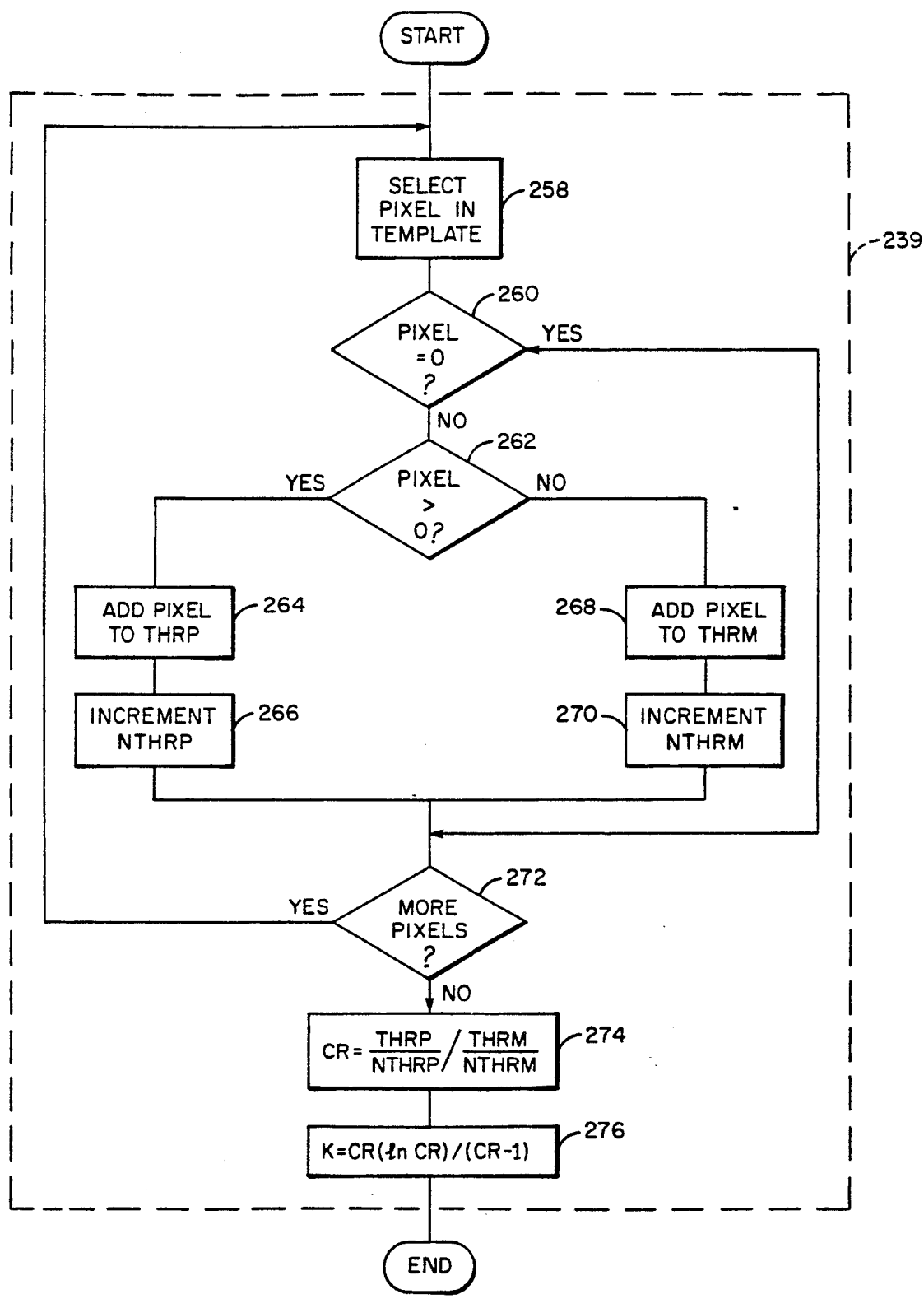
FIG. 7B is a flow diagram of the processing performed by the reference template generator in FIG. 2 to form a correlation threshold.

FIGS. 7A and 7B show details of the processing performed by reference template generator 34 (FIG. 2) to compute the template and correlation threshold. All the pixels in the EEB image are processed sequentially as selected by processing block 240. If that pixel does not correspond to an edge as determined at decision block 242, the next pixel is processed. If that pixel is an edge, i.e., the pixel in the EEB map is non-zero, a plurality of pixels will be set in the template corresponding to it.

Decision block 246 checks if the selected pixel is on the bright side or dark side of the edge. To determine which side of the edge the pixel is on, the level of the corresponding pixel in the SRBE map is compared to the value of a neighboring pixel in the SRBE map with a different value. If the value of the corresponding pixel is greater than the neighboring pixel, the pixel is on the bright side of the edge. If the pixel is on the bright side of the edge, a variable, BRTT, is set to $+1$ by processing block 248. Otherwise, BRTT is set to $-1$ at processing block 250.

Processing block 252 selects the pixels in a $5 \times 5$ local window in the SRBE map centered on the pixel selected at processing block 240. In processing the pixels under the local window, the four outermost corner pixels are excluded. When the local window is centered over pixels near the sides of the SRBE image, parts of the local window may "hang over" the edge of the image. In such case, only the pixels in the image under the window are considered.

Processing block 254 identifies all the pixels in the local window which have the same value as the pixel in the SRBE map corresponding to the pixel selected at processing block 240 (i.e., the pixels on the same side of the edge). The corresponding pixels in the template are set to whatever value BRTT was assigned at processing block 248 or 250. The remaining pixels in the EEB map are then processed until decision block 256 determines all have been processed, thereby completing the template.

FIG. 7B shows the processing needed to compute the correlation threshold, K. Each pixel in the template is processed sequentially as selected by processing block 258. If the pixel is zero, as determined by decision block 260, the next pixel is processed. If the pixel is greater than zero, as determined by decision block 262, the value of the corresponding pixel in the EPS image is added to a variable, THRP, at processing block 264 and a counter variable, NTHRP, is incremented at processing block 266. Conversely, if the pixel is less than 0, the value of the corresponding pixel in the EPS image is added to a variable, THRM, at processing block 268, and a counter variable, NTHRM, is incremented at processing block 270. The process is repeated for all pixels in the image, as determined by decision block 272. Processing block 274 computes a value for a variable CR according to the equation $$CR = (THRP/NTHRP)/(THRM/NTHRM) \qquad \text{Eq. (4)}$$

Note that CR should exceed 1. A value of CR less than 1 indicates the reference image selected by target designator 19 (FIG. 1) does not contain edges which form a good template. If CR is less than 1, target designator 19 (FIG. 1) might select a different reference image. Finally, the correlation threshold, K, is computed at processing block 276 according to the formula $$K = CR (\ln CR)/(CR-1) \qquad \text{Eq. (5)}$$

where ln is the natural logarithm function.

In an alternative embodiment of the invention, the entire processing shown in FIG. 7B can be omitted by setting K equal to 1.4.

ON-MISSILE PROCESSOR

The template and the correlation threshold are then passed to the on-missile processor 40 (FIG. 1). The on-missile processor 40 (FIG. 1) matches the template to images made by SAR 18B (FIG. 1). It should be noted that the processing needed to produce the template is performed once in the on-aircraft processor 20 (FIG. 1). As indicated in FIG. 2, the identification of the target from the image made by SAR 18B (FIG. 1) requires less processing.

It should be noted that the template was formed from a reference image consisting of a piece of an image made by SAR 18A (FIG. 1). That piece of the image is chosen to contain enough edges to give a relatively high value of CR as computed in Eq. (4). For example, the reference image may be a $32 \times 32$ pixel array selected from a larger $64 \times 64$ pixel array. The target area image formed by SAR 18B (FIG. 1) would then likewise be a $64 \times 64$ pixel array. In a manner which is described in more detail below, on-missile processor 40 (FIG. 2) would match the template with a $32 \times 32$ pixel portion of the target area image made by SAR 18B (FIG. 1). The location in the target area image of the matching portion tells the direction of the target in relation to direction of travel of missile 16 (FIG. 1). For example, if the designated target location in the matching portion were directly to the right of the center of the target area image, on-missile processor 40 (FIG. 1) would identify that the target was to the right of the line of travel of missile 16 and send a signal to the missile guidance system (not shown) to guide missile 16 towards the right. On-missile processor 40 (FIG. 1) can provide additional information to the missile guidance system on how much the line of travel should be adjusted.

Figure 8A:
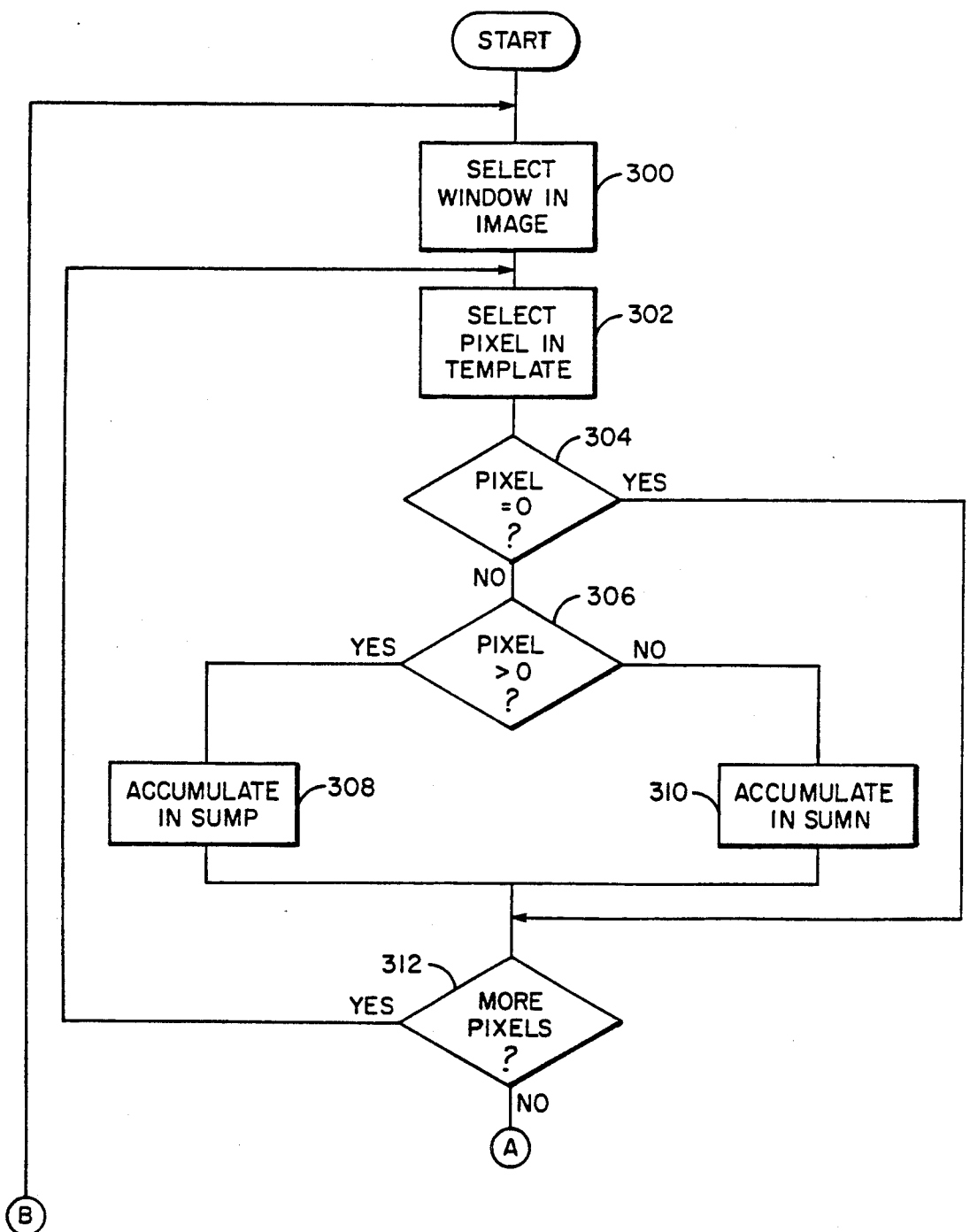
FIG. 8A is the first portion of a flow diagram of the processing performed by the on-missile processor in FIG. 2.
Figure 8B:
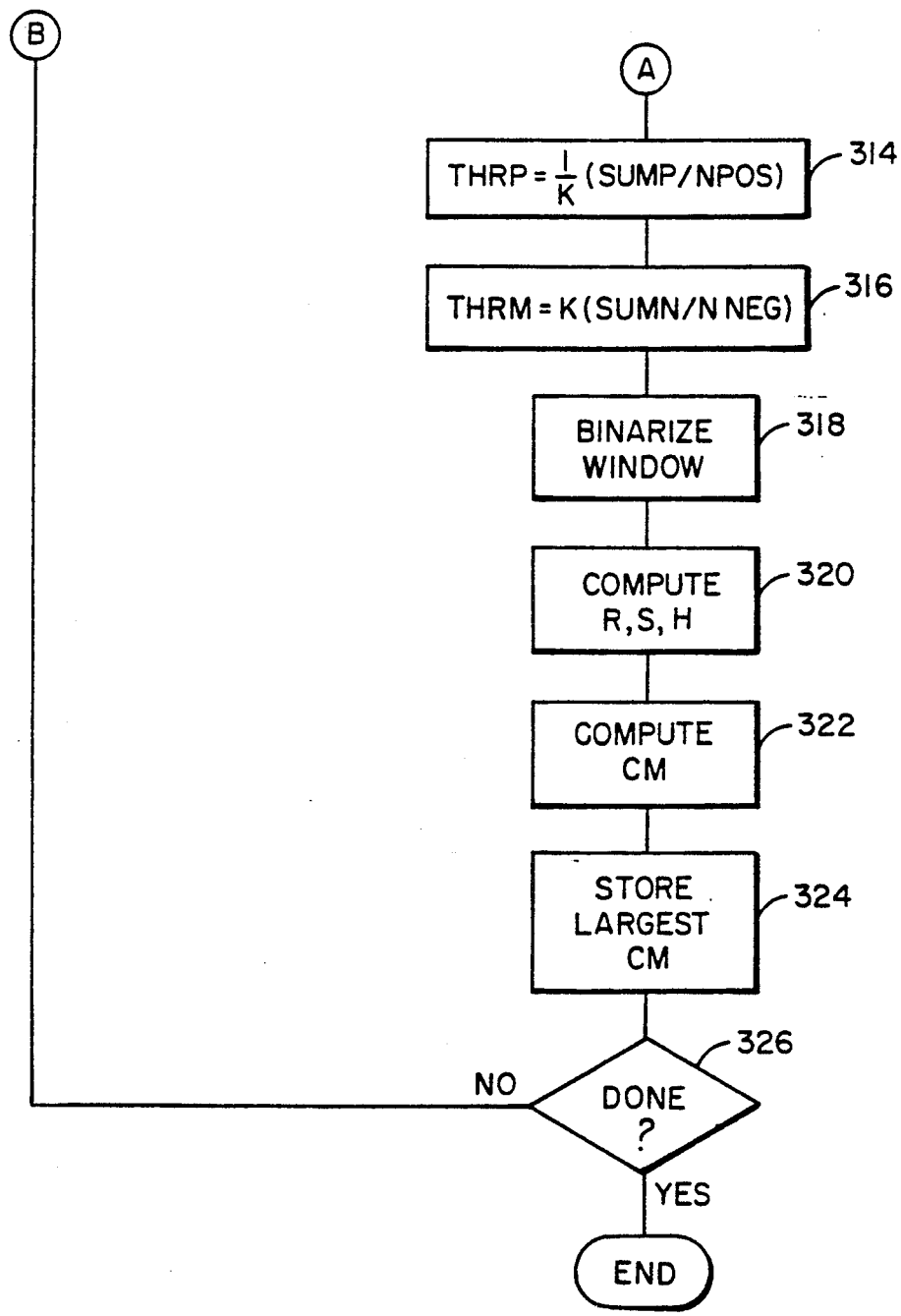
FIG. 8B is the continuation of the flow diagram of FIG. 8A.

The details of the processing performed by edge template correlator 42 (FIG. 2) to match the template to target area image formed by SAR 18B (FIG. 1) are shown in FIGS. 8A and 8B. Before turning to FIGS. 8A and 8B in detail, it should be noted that the target area image formed by SAR 18B (FIG. 1) might be filtered to remove noise, such as by noncoherent integrator 22B (FIG. 2), before being processed by edge template correlator 42 (FIG. 2). Noncoherent integrator 22B (FIG. 2) operates the same as noncoherent integrator 22A (FIG. 2) described previously.

Turning now to FIGS. 8A and 8B, processing in the edge template correlator 42 (FIG. 2) begins at processing block 300 which selects a local window in the target area image produced by SAR 18B (FIG. 1). The local window is the same size as the template produced by reference template generator 34 (FIG. 2). The local window is slid over the image produced by SAR 18B and processing block 300 selects one local window position that has not previously been considered. Processing block 302 selects a pixel in the template. Every pixel in the template will be considered and processing block 302 selects one that has not previously been considered. If the selected pixel is 0 as determined by decision block 304, the next pixel in the template is considered. If the pixel is non-zero, decision block 306 determines if the pixel is greater or less than 0.

If the pixel is greater than 0, the value of the corresponding pixel in the sensed image is added to a variable, SUMP, at processing block 308. A counter, NPOS, is also incremented by one. Conversely, if the pixel is less than 0, processing block 310 adds the value of the corresponding pixel in the sensed image to a variable, SUMN, and increments a counter, NNEG, by one. Each pixel is processed sequentially until, as determined by decision block 312, all pixels have been processed. Once all the pixels within a local window have been processed, processing block 314 computes a positive threshold, THRP, according to the formula:

$$THRP = (1/K)(SUMP/NPOS)$$

where K is the correlation threshold produced by reference template generator 34 (FIG. 2) and SUMP and NPOS are the variables set at processing block 308. Processing block 316 computes a negative threshold, THRN, according to the formula:

$$THRM = K(SUMN/NNEG)$$

where SUMN and NNEG are the variables set at processing block 310.

Processing block 318 creates a binarized array of the same dimensions as the template. All pixels in the binarized array corresponding to pixels equal to zero in the template equal zero. For each pixel in the template with a value greater than zero, the corresponding pixel in the local window selected at processing block 300 is compared to the threshold THRM. For each pixel in the template with a value less than zero, the corresponding pixel in the local window is compared to the threshold THRP. For either value of threshold, if the pixel in the local window is above the threshold, the corresponding pixel in the binarized array equals $+1$. Otherwise, the pixel in the binarized array equals $-1$.

Processing block 320 compares the pixels in the binarized image and the template to determine values for the following variables:

$R_1$ = number of pixels in template with values less than 0;

$R_2$ = number of pixels in template with values greater than 0;

$S_1$ = number of pixels in binarized array with values less than 0;

$S_2$ = number of pixels in binarized array with values greater than 0;

$H_{11}$ = number of pixels in template with values less 0 and with the corresponding pixel in the binarized array less than 0;

$H_{12}$ = number of pixels in the template with values less than 0 and with the value of the corresponding pixel in the binarized array greater than 0;

$H_{21}$ = number of pixels in the template with values of greater than 0 and with the value of the corresponding pixel in the binarized array less than 0;

$H_{22}$ = number of pixels in the template with values greater than 0 and with the value of the corresponding pixel in the binarized array greater than 0.

The quantities $R_1$, $R_2$, $S_1$, $S_2$, $H_{11}$, $H_{12}$, $H_{21}$ and $H_{22}$ are used at processing block 322 to compute a correlation map CM according to the equation:

$$kR_1 \; kR_2 \; kR_2 \; kR_2 \; kR_1 \; kR_1$$

$$CM = (H_{11} H_{22})/((AH_{21}+H_{22})(AH_{12}+H_{11})) \qquad \text{Eq (6)}$$

where $k = 2CC/(R_1+R_2)$, and

A and CC are constants empirically chosen to vary the enhancement of the correlation map.

Typically, CC is between 0 and 4 and A is between 1 and 7. It should be noted that processing block 320 falls in a loop in the flow diagram such that a value for CM is computed for each local window selected from the target area image. Processing block 324 checks each value of CM and stores the largest one. Processing block 324 also stores the location in the target area image at which the local window selected at processing block 300 yielded the largest value of CM. Decision block 326 causes the entire process to be repeated for every possible local window in the sensed image.

When the processing in FIG. 8 is completed, the largest value of CM has been identified by processing block 324. The largest value of CM implies that the template best matches the local window in the target area image used to compute that value of CM. The location of the matching local window in the target area image formed by SAR 18B (FIG. 1) indicates the location of the target in the target area image (i.e., the center of the matching local window in the image formed by SAR 18B has the same relation to the target as the center of the reference image selected by target designator 19 (FIG. 1) has to the target in the image formed by SAR 18A). This location can be provided to the missile control system to adjust the line of flight of the missile.

ALTERNATIVE EMBODIMENT OF TEMPLATE GENERATOR AND EDGE TEMPLATE CORRELATOR

An alternative method may be used to produce a template and match it to the target area image. The alternative methods replace the methods shown in FIGS. 7A, 7B and 8a and 8B. The alternative methods require more processing in reference template generator 34 (FIG. 2), making them less desirable than the preferred embodiment in some applications. However, the alternative embodiment described below may produce a template which more accurately matches the target area image and can often result in reduced processing in edge template correlator 42 (FIG. 2).

In the preferred embodiment, the template was an array representing confirmed edges detected in the reference image. A single threshold, K, was computed for the template and used by edge template correlator 42 to match the template to the target area image. In the alternative embodiment, the template consists of a pair of lists of pixels for each edge identified in the reference image. A separate threshold is computed for each edge. Separate thresholds for each edge make it more likely that edge template correlator 42 will match the template to the portion of the target area image actually containing the target. The alternative representation of the template provides an additional advantage in that the computer implementing on-missile processor 40 (FIG. 2) requires less digital memory to store that template than if the template were formed using the preferred embodiment.

Figure 9A:
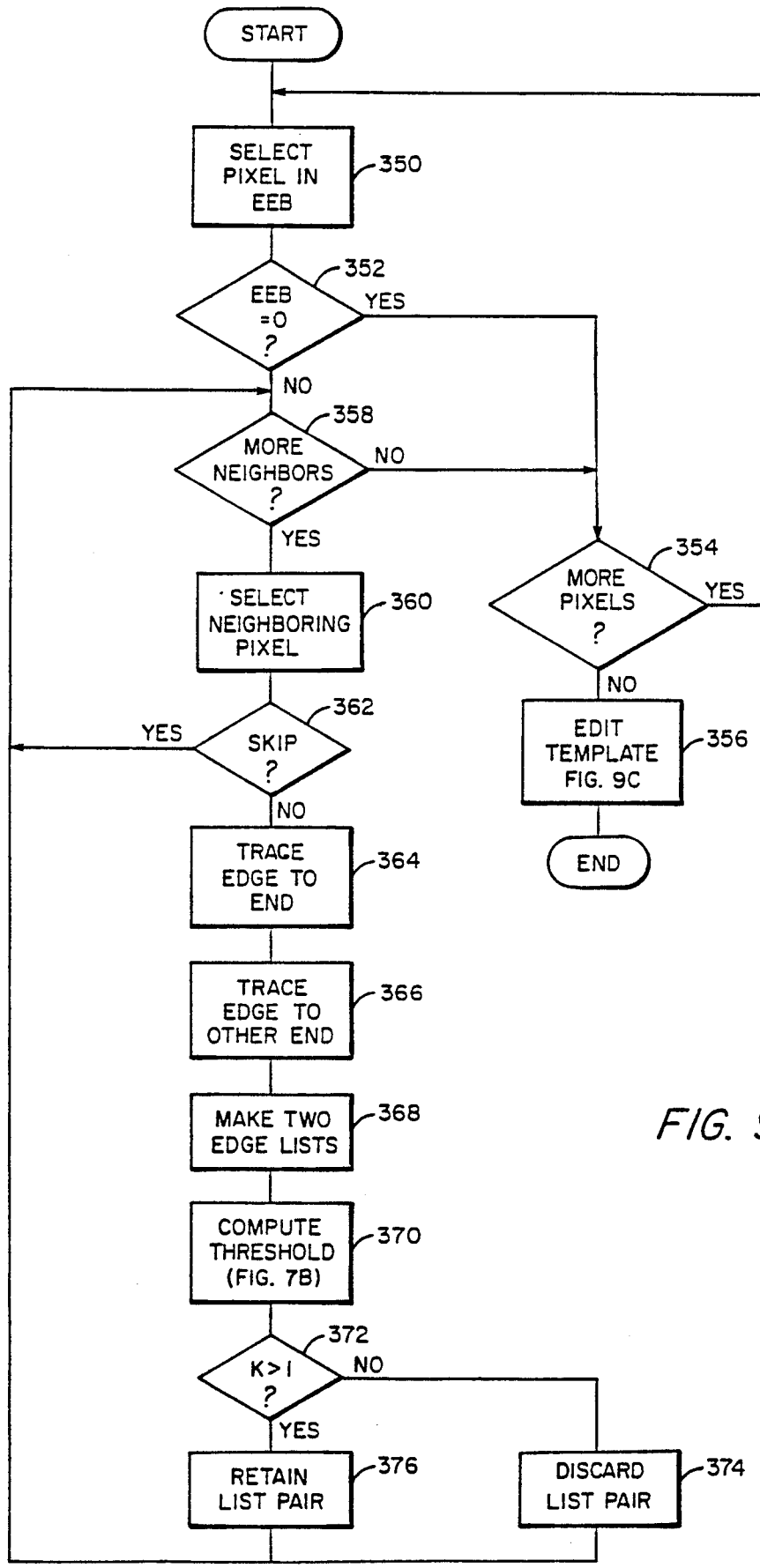
FIG. 9A is a flow diagram of the processing performed by an alternative embodiment of the reference template generator in FIG. 2.

FIG. 9A shows the processing performed by the reference template generator 34 (FIG. 2) in the alternative embodiment. Processing block 350 selects a pixel in the EEB map. Since each pixel in that map is processed, processing block 350 selects a pixel which has not previously been processed.

Decision block 352 determines whether the selected pixel equals 0, i.e., that it does not represent an edge. If the selected pixel does not represent an edge, the next pixel in the EEB map will be selected if more pixels remain to be processed. Decision block 354 determines whether more pixels remain.

The selected pixel which represents an edge is the first entry in a list of locations of pixels along an edge. Subsequent processing adds the locations of other pixels along the edge by examining adjacent pixels to determine if they also fall along the edge.

Decision block 358 determines whether each of the four nearest neighboring pixels to the selected pixel has been checked for possible addition to the list. If one or more of the nearest neighboring pixels remains to be tested, processing block 360 selects one of the remaining neighboring pixels. On the other hand, if all neighboring pixels have been tested, processing goes to decision block 354, allowing another pixel to be selected. It should be noted that if two pixels are adjacent and the second is tested to determine if it is on the same edge as the first, it is not necessary to test the first to determine if it is on the same edge as the second. Decision block 358 takes advantage of this commutative property to avoid redundant processing of neighboring pixels.

Decision block 362 skips the selected neighboring pixel if the pixel in the SBRE map corresponding to the pixel selected at processing block 350 and the neighboring pixel selected at processing block 360 have the same value (i.e., are on the same side of the edge). The neighboring pixel is also skipped if its value is 0 (i.e. it is not on an edge) or if the pair of pixels has already been processed in conjunction with a list of pixels along a different edge.

Figure 9B:
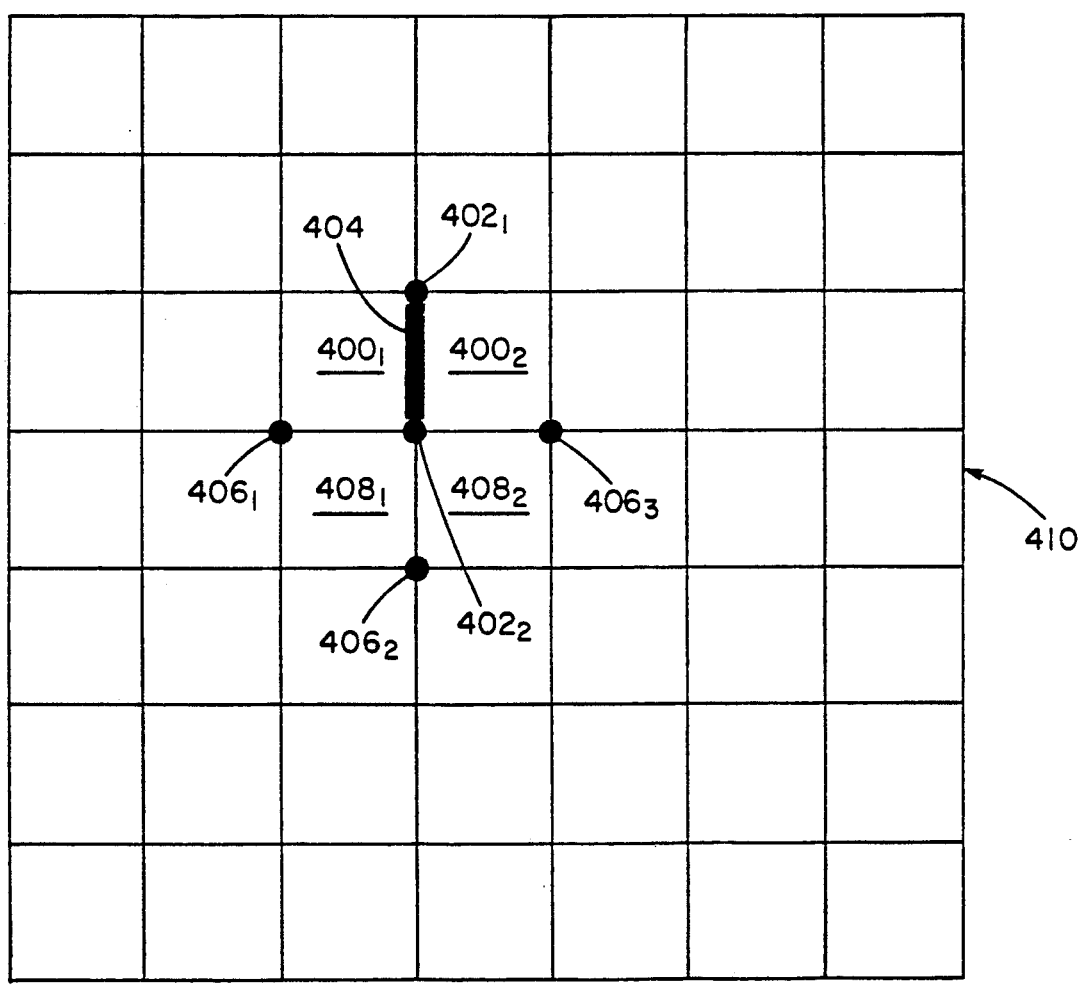
FIG. 9B is a sketch of the pixels considered during the processing shown in FIG. 9A.

If, as determined at decision block 362, the neighboring pixel is not skipped, its location becomes part of the list of pixel locations along an edge. Processing block 364 uses the two selected pixels as a starting point to identify the pixels along that edge. FIG. 9B depicts a portion 410 of a two-dimensional array and shows how processing block 364 selects a pixel for addition to the list of pixels on the edge. Pixel $400_1$ is representative of the pixel selected at processing block 350 (FIG. 9A). Pixel $400_2$ is representative of the neighboring pixel selected at processing block 360 (FIG. 9A). Nodes $402_1$ and $402_2$ represent the points where four pixels join. As pixels $400_1$ and $400_2$ were selected to be on different sides of an edge, edge segment 404 represents where the edge falls.

The edge will be extended by finding other pairs of pixels on opposite sides of the edge and also adjacent to at least one of the pixels already found to be on the edge. The edge might be extended from one of its two sides. In FIG. 9B, the edge might be extended from node $402_1$ or from node $402_2$. Here, it is arbitrarily chosen that the edge is extended from node $402_2$.

In extending the edge from node $402_2$, it might be extended to potential node $406_1$, $406_2$ or $406_3$. The direction in which the edge is extended depends on which side of the edge pixels $408_1$ and $408_2$ fall. As described above in connection with the discussion of global edge detector 30 (FIG. 2), the SRBE map has segmented the reference image into a number of regions and, for the purposes of this template generation, the edges are defined to fall between those regions. If pixel $408_1$ is, as described by the SRBE map, in the same region as pixel $400_1$ and pixel $408_2$ is in the same region as pixel $400_2$, the edge must include potential node $406_2$ and pixels $408_1$ and $408_2$ are added to the list of edge pixels. Another possibility is that pixels $408_1$ and $408_2$ are in the same region as pixel $400_1$. In that instance, the edge is extended to include potential node $406_3$ and pixel $408_2$ is added to the list of edge pixels. The final possibility is that pixels $408_1$ and $408_2$ are in the same region as pixel $400_2$. In that case, the edge is extended to include potential node $406_1$ and pixel $408_1$ is added to the list of edge pixels.

The edge is further extended by following the pattern shown in FIG. 9B. Node $402_2$ was the last node added to the edge and $402_1$ was the second to last node added to the edge. Once one of the potential nodes $406_1$, $406_2$ or $406_3$ is added to the edge, node $402_2$ is the second to the last node and whichever potential node was added to the list is the last node. A new set of potential nodes near the last node on the edge is determined using the same pattern as shown in FIG. 9B. In following the pattern, the two pixels adjacent to the last node added to the edge and adjacent to the second to the last node added to the edge are used where the pixels $400_1$ and $400_2$ were used. Similarly, where pixels $408_1$ and $408_2$ were used, the two pixels adjacent to the last node added to the edge and not adjacent to the second to the last node added to the edge are used.

The pattern illustrated by FIG. 9B is followed until the complete edge is traced. The end of an edge is detected when the two pixels adjacent to the last node not adjacent to the second to the last node (e.g., pixels $408_1$ and $408_2$) are not on an edge as reported by the EEB map (i.e. the corresponding values in the EEB map are 0). The end of an edge might also be recognized when the pixels which would have to be considered to follow the pattern do not exist because some boundary of the array is reached. Alternatively, the end of the edge is detected where any of the pixels which would have to be considered to follow the pattern in FIG. 9B have already been added to a list of edge pixels, as would be the case if a closed edge were traced all the way around. The end of an edge is also detected if the two pixels adjacent to the last node not adjacent to the second to last node (e.g., pixels $408_1$ and $408_2$) do not have the same value as either of the pixels selected at processing block 350 or 360 (i.e., pixels $400_1$ or $400_2$). This condition can only occur if the alternative technique for forming the SRBE image is used such that the pixels in that image could take on values of 1, 2, 3 or 4.

Once processing block 364 has traced the edge fully in one direction, processing proceeds to processing block 366 which traces the edge in the other direction. The same pattern as is followed by processing block 364 is followed except that in processing block 366 node $402_1$ is initially considered the last node and node $402_2$ is initially considered the second to last node. The edge is then extended from node $402_1$. For the special case that the edge was traced around in a closed loop at processing block 364, processing block 366 performs no further processing.

Once the edge has been traced to both ends by processing blocks 364 and 366, the list of pixels on the edge is broken down into two lists at processing block 368. Each pixel which is on the high intensity side of an edge, as evidenced by a large value in the SRBE map, is put in the high intensity list. The remaining pixels are put in the low intensity list. The lists also contain the pixels which are close to the edges, say within three pixels on each side of the edge.

Processing block 370 computes a correlation threshold, K, for the edge represented by the list pair formed at processing block 368. Processing block 370 uses the process shown in FIG. 7B and described above. Because the edge pixels have already been identified and segregated into lists of pixels on the high intensity and low intensity sides of an edge, the processing in FIG. 7B which performs that function might be omitted for simplicity. Decision block 260 in FIG. 7B checks if the selected pixel is on an edge. Since all pixels in the lists are on an edge, that decision block may be omitted. Decision block 262 checks if a selected pixel is on the high intensity or low intensity side of an edge. Since the pixels have already been sorted into a high intensity and low intensity list, decision block 262 merely needs to direct program execution to processing block 264 when pixels from the high intensity list are selected at processing block 258 and to processing block 268 when pixels from the low intensity list are selected.

Returning now to FIG. 9A, once a correlation threshold, K, is computed at processing block 276 (FIG. 7B), decision block 372 checks if the value of K exceeds 1. If the value of K is too small, the list pair is discarded by processing block 374 such that those lists will not be further considered for inclusion in the template. If, on the other hand, K is large enough, the lists are stored at processing block 376 for further processing. Processing block 376 also stores the correlation threshold, K, computed for those lists. Regardless of whether the lists are retained, processing returns to decision block 358.

Decision block 358, as described above, determines that all neighbors of the pixel selected at processing block 350 have been checked for being along the same edge as the selected pixel. When all the neighbors of the selected pixel are checked, another pixel is selected as long as decision block 354 determines more pixels remain to be tested. However, block 362 will skip any pair (of a pixel and a neighbor) if the pixel is already included in a list of pixels near an edge of the neighbor is on the list for the other side of the edge. Otherwise, even if the pixel is already on a list, the selected pixel may represent a pixel on a different edge than previously traced out. In that case, the edge will be traced out at processing blocks 364 and 366, eventually resulting in another list pair. That list pair might also be stored at processing block 376, depending on the results of the comparison made by decision block 372. Thus, when all the pixels in the EEB map have been selected and processed, several pairs of lists of pixels along different edges may have been retained by processing block 376. When, as determined by decision block 354, all pixels in the image have been processed, the retained list pairs form the basis of the template.

The retained list pairs might be further processed at processing block 356. The details of that processing are described below in conjunction with FIGS. 9C and 9D. The output of processing block 356 is the output of reference template generator 34 (FIG. 2). Alternatively, processing block 356 may be skipped and the output of reference template generator 34 (FIG. 2) consists of all the list pairs retained at processing block 376.

Figure 9C:
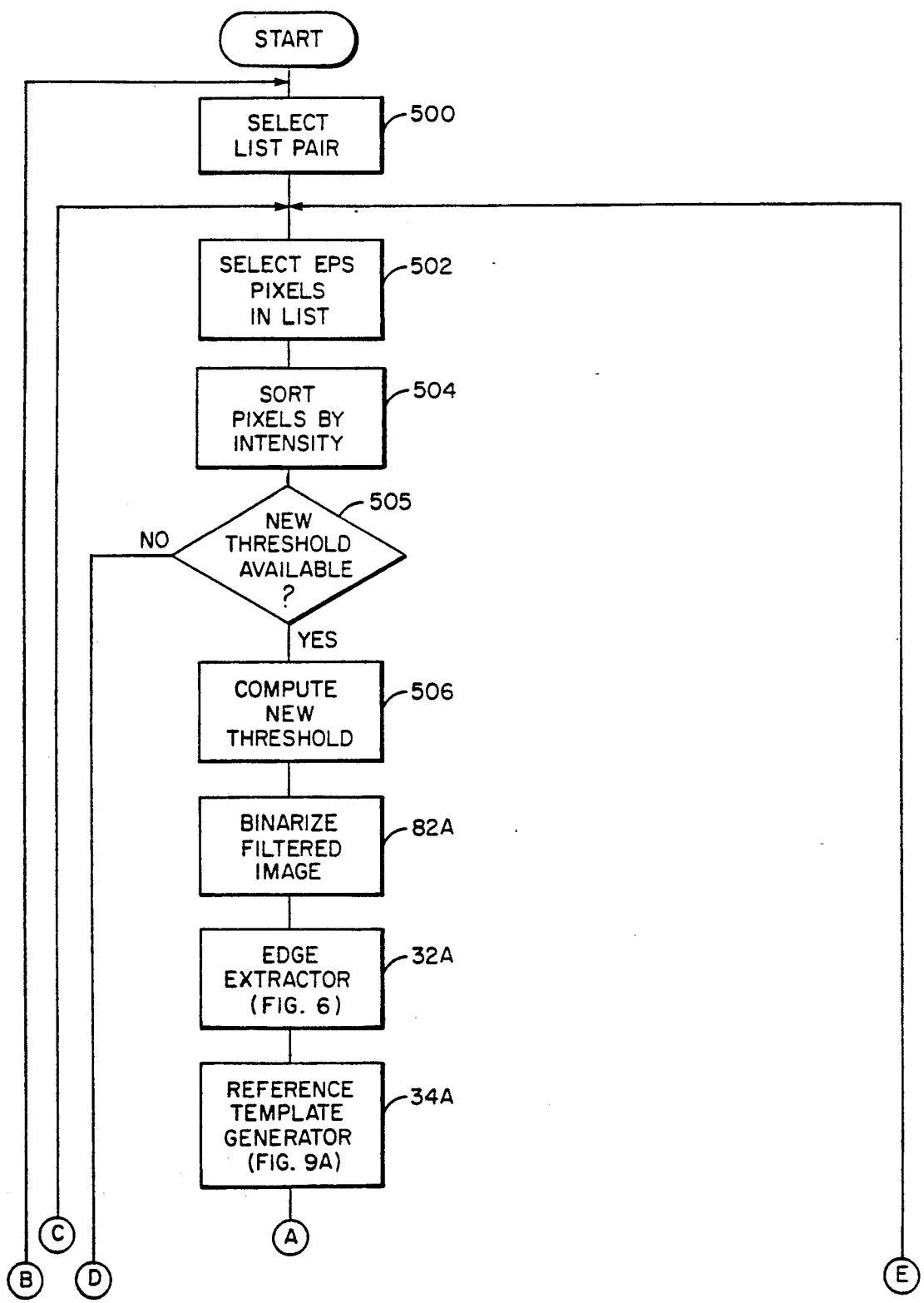
FIG. 9C is the first portion of a flow diagram of the template editing performed as part of the processing shown in FIG. 9A.
Figure 9D:
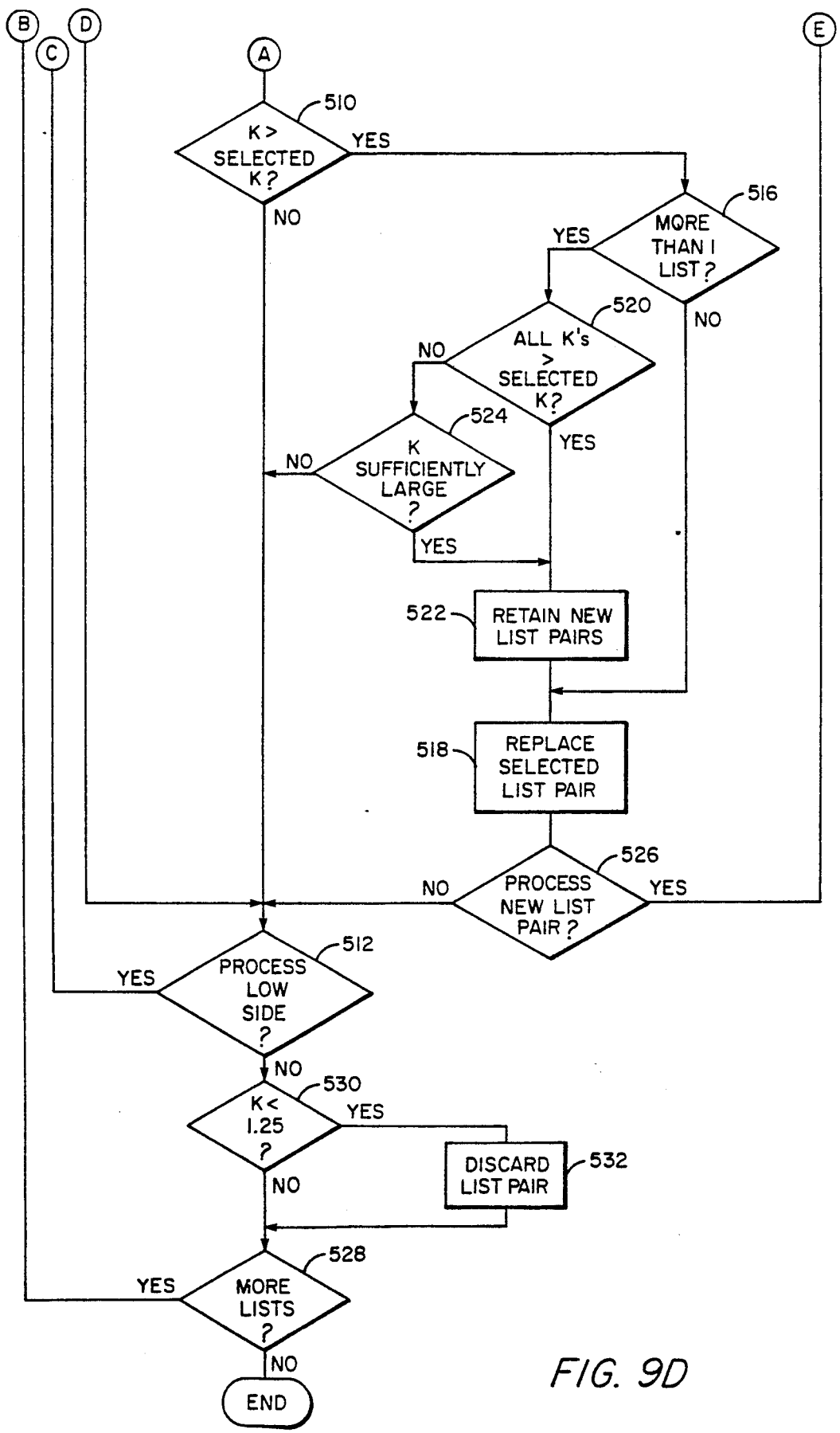
FIG. 9D is the continuation of the flow diagram in FIG. 9C.

Turning now to FIGS. 9C and 9D, the processing on the retained pairs of lists of pixels on edges is shown. Each pair of lists represents an estimate of the location of an edge. For any number of reasons, the estimate of the edge location may not be the best possible estimation of the edge location. The processing shown in FIGS. 9C and 9D serves to modify the pairs of lists describing the edge to find a better estimate of the edge location.

Processing block 500 selects one of the list pairs stored at processing block 376 (FIG. 9A). Each list pair must be processed and processing block 500 selects one pair not previously processed.

Processing block 502 selects pixels from the filtered image produced by smoothing filter 26 (FIG. 2). Processing block 502 selects those pixels corresponding to the pixels in the high intensity list of the selected pair of lists.

Processing block 504 sorts the selected pixels according to their respective intensities. Decision block 505 checks if a new threshold can be computed to identify edges by segmenting the selected pixels into those above and below the threshold (the edge would likely be between the regions of pixels above and below the threshold). To determine if an appropriate threshold exists, decision block 505 identifies the pixel one-quarter of the way from the bottom of the order created by processing block 504. Decision block 504 then determines if any of the other pixels selected at processing block 502 have values different than the value of the pixel one-quarter from the bottom. If there is such a pixel with a different value, a new threshold is computed at processing block 506. Otherwise, processing resumes at decision block 512.

Processing block 506 computes the new threshold. The threshold is the average of the value of the pixel one-quarter from the bottom of the ordering produced at processing block 504 and the value of the next nearest pixel in the ordering having a different value. Here, "nearness" is measured proportionately to the end of the ordering produced at processing block 504. For example, a pixel one-eighth from the bottom of the ordering is further from the pixel one-quarter from the bottom than is a pixel one-half from the bottom, since one-eighth is half-way from one-quarter to the bottom, while one-half is only one-third way from one-quarter to the top.

Processing block 82A then binarizes the filtered image using the computed threshold. Those pixels in the segmented image corresponding to pixels in the filtered image with intensities below the threshold are given a value of 1. Those pixels in the segmented image corresponding to pixels in the filtered image with intensities above the threshold are given a value of 4. The binarization process is identical to that in processing block 82 (FIG. 3A) and similarly results in a segmented image. However, processing block 82A operates on selected pixels rather than the entire image. Processing block 82A only operates on those pixels selected at processing block 502 and the eight nearest neighbors for each of those.

The segmented image serves as an input to edge extractor 32A. Since edge extractor 32A is identical to edge extractor 32 (FIG. 2), it performs the processing already described in connection with FIGS. 6A and 6B except that only a small portion of the image is involved. Processing block 32A operates on the same group of pixels as processing block 82A.

The confirmed edge map produced by edge extractor 32A is processed by reference template generator 34A. The operation of an alternative embodiment of reference template generator 34 (FIG. 2) is shown in FIG. 9A. Reference template generator 34A performs the processing shown in FIG. 9A with one exception. Processing block 356 (FIG. 9A) at which the pairs of lists of pixels along edges are edited is not performed. The list pairs with their respective correlation thresholds retained at processing block 376 (FIG. 9A) are simply provided as the output of reference template generator 34A in FIGS. 9C and 9D.

Decision block 510 compares the correlation thresholds of any list pairs produced by reference template generator 34A to the correlation threshold of the list pair selected at processing block 500. If no list pairs were produced by reference template generator 34A, processing proceeds at decision block 512. If the correlation thresholds of all the newly produced list pairs are below the correlation threshold of the list pair selected at processing block 500, no further processing is performed on the newly produced list pairs. Processing then continues at decision block 512 on the list pair selected at processing block 500 and the newly produced list pairs are effectively ignored.

If, as determined at decision block 510, one of the newly produced list pairs has a correlation threshold exceeding the correlation threshold of the list pair selected at processing block 500, processing continues at decision block 516. Decision block 516 determines if more than one list pair was produced by reference template generator 34A. If only one list pair was produced, the list pair selected at processing block 500 is deleted from the template at processing block 518 and that newly produced list is added to the template.

If multiple list pairs were produced by reference template generator 34A, decision block 520 determines if all of the newly produced list pairs have correlation thresholds exceeding the correlation threshold of the list pair selected at processing block 500. If all of the newly produced list pairs have correlation thresholds above the correlation threshold of the list pair selected at processing block 500, processing block 522 retains all of the list pairs for further consideration as part of the template. Processing block 518 replaces the list pair selected at processing block 500 with one of the newly produced list pairs. The other newly produced list pairs are stored by processing block 522. Those newly produced list pairs are called "spin-off list pairs" and are treated just like the list pairs retained at processing block 376 (FIG. 9A).

If not all of the newly produced list pairs have correlation thresholds exceeding the correlation threshold of the list pair selected at processing block 500, decision block 524 examines the largest correlation threshold of all the newly produced list pairs. If that correlation threshold is sufficiently larger than the correlation threshold of the list pair selected at processing block 500, all of the newly produced list pairs will be processed at processing blocks 522 and 518 as described above. Otherwise, none of the newly produced list pairs will be processed and processing will continue at decision block 512. In the present embodiment, decision block 524 determines a newly produced correlation threshold to be sufficiently larger than another if it is at least five percent larger or is larger by at least 0.1.

If any of the above-described conditions occurs such that processing block 518 replaces the list pair selected at processing block 500, processing returns to processing block 502. The above-described processing is then repeated with the new list pair used in place of the list pair previously selected at processing block 500. However, unless some limits were imposed, the processing might repeatedly return to processing block 502. Decision block 526 determines how many times processing returns to processing block 502. If processing block 518 is executed three times without decision block 512 being executed, decision block 526 prevents processing from returning to processing block 502. Instead, decision block 512 is executed.

It should be recalled that processing block 502 selected the pixels in the EPS image corresponding to the pixels in the high intensity list of the list pair selected at processing block 500. The low intensity list of the selected list pair might be similarly processed. Decision block 512 determines if the low intensity list of the selected list pair should be processed. In this case, the selected list pair might be the list pair selected at processing block 500 or the replacement for that list pair made at processing block 518. If the selected list is a new list pair stored by processing block 522 or a replacement list pair stored at processing block 518, the low intensity list of the pair is processed only if the correlation threshold of the selected list pair is lower than the correlation threshold for the original list pair. If the low intensity list has been processed or does not need to be processed, processing goes to decision block 530 which checks if the correlation threshold of the selected list pair exceeds a minimum value, here 1.25. If the correlation threshold is below that value, the list pair is discarded at processing block 32 and does not become a part of the template. Execution then goes to decision block 528 which routes execution back to processing block 500 where another list pair is selected and the entire process is repeated.

If the low intensity list of the selected list pair is to be processed, processing block 502 selects the pixels in the EPS image corresponding to the pixels in the low intensity list. Processing of those selected pixels proceeds much as it did for the pixels selected using the high intensity list. The only difference is that decision block 505 and processing block 506 operate on the pixel three-quarters of the way from the bottom of the sorted list as opposed to the pixel one-quarter of the way from the bottom.

Once, as determined at decision block 528, all the retained list pairs have been processed, the template editing process ends. The list pairs with their respective correlation thresholds make up the template which is the output of reference template generator 34 (FIG. 2).

It should be noted that the template produced by the alternative embodiment of reference template generator 34 (FIG. 2) produces a template of a different form than the preferred embodiment of reference template generator 34 (FIG. 2). Thus, a modification to edge template correlator 42 (FIG. 2) is required.

Figure 10:
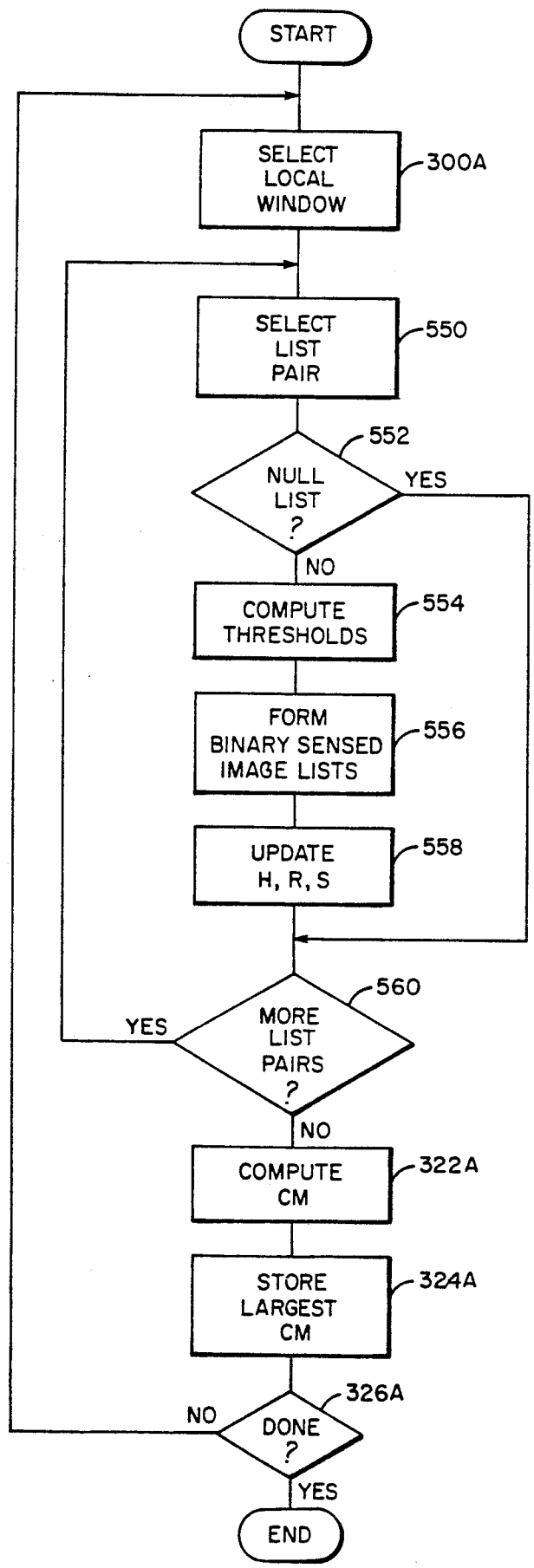
FIG. 10 is a flow diagram of the processing performed by an alternative embodiment of the on-missile processor in FIG. 2.

FIG. 10 shows the processing to be performed by the alternative embodiment of edge template correlator 42 (FIG. 2). Processing block 300A, in conjunction with decision block 326A, slides a local window over the target area image the same way as processing block 300 and decision block 326 (FIG. 8).

Processing block 550 selects one of the list pairs which make up the template. Each list pair is processed in turn such that processing block 550 selects a list pair which has not been previously processed. Decision block 552 makes sure the selected list pair has entries in both its high intensity and low intensity lists. If either list has no entry, that list pair is skipped. Otherwise, execution continues at processing block 554.

Processing block 554 computes two thresholds for the selected list pair. The thresholds THRP and THRM are computed according to the following equations:

$$THRP = (SUMP/NPOS)/K$$

$$THRM = K (SUMN/NNEG)$$

where

K is the correlation threshold for that list pair;
SUMP is the sum of the intensities of all the pixels in the local window of the target area image corresponding to pixels in the high intensity list;
SUMN is the sum of the intensities of all the pixels in the local window of the target area image corresponding to pixels in the low intensity list;
NPOS is the number of pixels in the high intensity list; and
NNEG is the number of pixels in the low intensity list.

Processing block 556 uses the threshold THRP and THRM to form two binary sensed image lists denoted SENB+ and SENB−. The SENB+ list has as many entries as there are pixels in the high intensity list of pixels. The SENB− list has as many entries as there are pixels in the low intensity list of pixels. For each pixel in the high intensity list the corresponding pixel in the local window of the target area image is identified. If the intensity of that pixel exceeds THRM, the entry in the SENB+ list corresponding to the pixel in the high intensity list is set to 1. Otherwise, the entry in the SENB+ list is set to −1. Similarly, for each pixel in the low intensity list, the corresponding pixel in the local window of the target area image is identified. If the intensity of that pixel exceeds THRP, the corresponding entry in SENB− is set to 1. Otherwise, it is set to −1.

Processing block 558 updates variables $R_1$, $R_2$, $S_1$, $S_2$, $H_{11}$, $H_{12}$, $H_{21}$ and $H_{22}$ based on the values assigned to the entries in the SENB+ and SENB− lists. The variables, which were initialized to zero before the start of the processing in FIG. 10, are updated according to the following formulas:

$R_1$ is augmented by the number of pixels in the low intensity list;
$R_2$ is augmented by the number of pixels in the high intensity list;
$S_1$ is augmented by the number of positive entries in SENB+ and SENB−;
$S_2$ is augmented by the number of negative entries in SENB+ and SENB−;
$H_{11}$ is augmented by the number of positive entries in SENB−;
$H_{12}$ is augmented by the number of negative entries in SENB−;
$H_{21}$ is augmented by the number of positive entries in SENB+; and
$H_{22}$ is augmented by the number of negative entries in SENB+.

Once the variables have been updated for one list pair, decision block 560 determines if any list pairs remain to be processed. If so, execution returns to processing block 550. The next list pair is selected and processed. When all lists pairs have been processed, decision block 560 diverts execution to processing block 322A. It should be noted that processing blocks 322A and 324A and decision block 326A are identical to processing blocks 322 and 324 and decision block 326 (FIG. 8). Thus, the results produced by the alternative embodiment of edge template correlator 42 (FIG. 2) are in the same form as the results produced by the preferred embodiment of edge template correlator 42 (FIG. 2).

What is claimed is:

1. In an imaging system representing objects by an image having an array of pixels, a method of selecting pixels in the image representing the edges of objects comprising the steps of:
   (a) selecting a local window of pixels in the image;
   (b) applying a plurality of masks to the pixels in the local window, each such mask comprising two equal sized groups of adjacent pixels and wherein application of each mask comprises:
      (i) adding the values of the pixels in the image corresponding to pixels in the first equal sized group;
      (ii) adding the values of the pixels in the image corresponding to pixels in the second equal sized group;
      (iii) computing the ratio of the sum of the pixels corresponding to the first group to the sum of the pixels corresponding to the second group; and
   (c) selecting the largest of the ratios and indicating an edge at the pixel in the center of the local window when the ratio exceeds a threshold.

2. The method of selecting pixels representing edges in an image of claim 1 wherein each mask has an angle associated therewith, said angle representing the direction of a line dividing the first equal sized group of pixels from the second equal sized group of pixels and each pixel indicating an edge has an angle associated with it, said angle equal to the angle associated with the mask producing the largest ratio.

* * * * *